United States Patent
Alessi et al.

(10) Patent No.: US 7,058,027 B1
(45) Date of Patent: Jun. 6, 2006

(54) SYSTEMS AND METHODS FOR ASYNCHRONOUS TRANSFER MODE AND INTERNET PROTOCOL

(75) Inventors: George H. Alessi, Roswell, GA (US); Charles G. Ray, Canton, GA (US); Ian Akyildiz, Alpharetta, GA (US); Mark Jensen, Acworth, GA (US); Guy Smith, Acworth, GA (US)

(73) Assignee: Scientific Research Corporation, Atlanta, GA (US)

( * ) Notice: Subject to any disclaimer, the term of this patent is extended or adjusted under 35 U.S.C. 154(b) by 0 days.

(21) Appl. No.: 09/787,300

(22) PCT Filed: Sep. 16, 1999

(86) PCT No.: PCT/US99/21333

§ 371 (c)(1),
(2), (4) Date: May 30, 2001

(87) PCT Pub. No.: WO00/16511

PCT Pub. Date: Mar. 23, 2000

Related U.S. Application Data

(60) Provisional application No. 60/100,618, filed on Sep. 16, 1998.

(51) Int. Cl.
*H04B 7/00* (2006.01)
*H04J 3/16* (2006.01)

(52) U.S. Cl. .................... 370/310.1; 370/352; 370/468
(58) Field of Classification Search .................. None
See application file for complete search history.

(56) References Cited

U.S. PATENT DOCUMENTS

| | | | |
|---|---|---|---|
| 4,047,151 A | 9/1977 | Rydbeck et al. | |
| 4,076,420 A | 2/1978 | De Maeyer et al. | |
| 4,792,946 A | 12/1988 | Mayo | |
| 4,802,761 A | 2/1989 | Bowen et al. | |
| 4,834,494 A | 5/1989 | DeMeritt et al. | |
| 4,948,214 A | 8/1990 | Hamblen | |
| 4,970,714 A | 11/1990 | Chen et al. | |
| 4,997,278 A | 3/1991 | Finlan et al. | |
| 5,155,726 A | 10/1992 | Spinney et al. | |
| 5,214,648 A | 5/1993 | Lespagnol et al. | |
| 5,332,690 A | 7/1994 | Cho et al. | |
| 5,359,681 A | 10/1994 | Jorgenson | |

(Continued)

OTHER PUBLICATIONS

Paul et al, "An Asymmetric Protocol for Digital Cellular Communications," *IEEE INFOCOM'95*, pp. 1053-1062, 1995.

(Continued)

*Primary Examiner*—Huy D. Vu
*Assistant Examiner*—Cynthia L. Davis
(74) *Attorney, Agent, or Firm*—Brenda O. Holmes; Kilpatrick Stockton LLP

(57) ABSTRACT

A protocol-independent error-control system includes several components (840a, 830a, 820a, 150b, 820b, 830b, 840b) that assist in providing more reliable data transmission between endpoints (110, 120): 1) an ATM adaptation layer that supports quality-critical and time-critical data; 2) a rate converter that uses a priority scheme to adjust the data rate for different types of data; and 3) an error-control subsystem that implements a data link protocol optimized for error-prone links, and capable of recognizing traffic from many kinds of network sources. The error-control subsystem may be used alone or in combination with the ATM adaptation layer (170, 172, 180, 182) and/or the rate converter (830).

15 Claims, 13 Drawing Sheets

U.S. PATENT DOCUMENTS

| | | | |
|---|---|---|---|
| 5,383,917 A | | 1/1995 | Desai et al. |
| 5,412,660 A | | 5/1995 | Chen et al. |
| 5,416,624 A | | 5/1995 | Karstensen |
| 5,432,787 A | | 7/1995 | Chethik |
| 5,434,853 A | | 7/1995 | Hemmady et al. |
| 5,485,277 A | | 1/1996 | Foster |
| 5,490,168 A | * | 2/1996 | Phillips et al. ............. 375/224 |
| 5,511,079 A | | 4/1996 | Dillon |
| 5,533,052 A | | 7/1996 | Bhaskar |
| 5,568,482 A | | 10/1996 | Li et al. |
| 5,600,653 A | | 2/1997 | Chitre et al. |
| 5,600,663 A | * | 2/1997 | Ayanoglu et al. ........... 714/774 |
| 5,620,481 A | | 4/1997 | Desai et al. |
| 5,647,030 A | | 7/1997 | Jorgenson |
| 5,648,969 A | | 7/1997 | Pasternak et al. |
| 5,693,078 A | | 12/1997 | Desai et al. |
| 5,699,365 A | | 12/1997 | Klayman et al. |
| 5,699,369 A | | 12/1997 | Guha |
| 5,710,756 A | | 1/1998 | Pasternak et al. |
| 5,717,689 A | | 2/1998 | Ayanoglu |
| 5,724,151 A | | 3/1998 | Ryley et al. |
| 5,729,641 A | | 3/1998 | Chandonet et al. |
| 5,745,504 A | * | 4/1998 | B.ang.ng .................... 714/752 |
| 5,757,771 A | | 5/1998 | Li et al. |
| 5,844,897 A | | 12/1998 | Asamizuya |
| 5,896,383 A | * | 4/1999 | Wakeland ................... 370/400 |
| 5,917,828 A | | 6/1999 | Thompson |
| 5,936,949 A | * | 8/1999 | Pasternak et al. .......... 370/328 |
| 5,956,344 A | | 9/1999 | Cole |
| 6,122,293 A | * | 9/2000 | Frodigh et al. ............. 370/473 |
| 6,289,485 B1 | * | 9/2001 | Shiomoto ................... 714/779 |
| 6,335,935 B1 | * | 1/2002 | Kadambi et al. ........... 370/396 |
| 6,587,457 B1 | * | 7/2003 | Mikkonen ................... 370/356 |

OTHER PUBLICATIONS

Perloff and Reiss, "Improvements to TCP Performance in High-Speed ATM Networks," *Communications of the ACM*, vol. 38, No. 2 (Feb. 1995).

Postel, "Transmission Control Protocol," *RFC 793* (Sep. 1981).

Proakis, J. G., *Digital Communications*, McGraw-Hill, 2nd edition, 1989.

Raychaudhuri, D., "ATM Based Transport Architecture for Multiservices Wireless Personal Communications Networks," *IEEE Journal on Selected Areas in Communications*, Oct. 1994.

Romanow and Floyd, "Dynamics of TCP Traffic over ATM Networks," *IEEE Journal on Selected in Communications*, vol. 13, No. 4, pp. 633-641 (May 1995).

Scholz et al., "Experimental Investigation of Multimedia Communications Over Degraded ATM Links," May 1995.

Schwartz, M., *Telecommunication Networks: Protocols, Modeling and Analysis*, Addison-Wesley, 1987.

Schwartz, "Telecommunications Networks: Protocols, Modeling and Analysis," *Addison-Wesley* (1987).

Sklar, Digital Communications, Fundamentals and Applications, *Prentice Hall*, pp. 460-464 (1988).

Sweeney, Terry, Wireless technology Aimed at WAN Arena, *CommunicationsWeek*, Jan. 13, 1997.

Tesfai and Wilson, "FEC Schemes for ATM Traffic over Wireless Links," *IEEE International Conference on Communications*, pp. 948-953, Aug. 1996.

Thyfault, Mary, "ATM Goes Local—Startup promises to help carriers roll out high-speed data networks in days," *Networking*, p. 81, Jan. 13, 1997.

Wallace, "Start-up cooks up ATM over microwave," *Computerworld*, Jan. 6, 1997.

Wirbel, Loring, "Startup's System Blends Key Technologies—'97 cranks volume on ATM-over-Radio," *Electronic Engineering Times*, p. 1 and 124 (undated).

Durkin, James, "Utilizing Leading Edge Management Technologies within the Tactical Environment," *MILCOM 1996 Proceedings*, Oct. 1996.

Halsall, F., *Data Communications, Computer Networks and Open Systems*, Addison-Wesley, 1996.

Henderson, Liza, "ATM in the sky," *Netro The Wireless ATM Company Telephony*, Jun. 23, 1997.

ITU-T Recommendation I.363, "BISDN ATM Adaptation Layer Specification," *CCITT SG 13*, Mar. 1993.

J. Hagenauer, "Rate-Compatible Punctured Convolutional Codes and their Applications," *IEEE Transactions on Communications*, vol. 36, No. 4, pp. 389-400, Apr. 1988.

Jakes, "Microwave Mobile Communications," *Wiley*, 1974 (Reissued by IEEE Press, 1994).

Joe, "An Adaptive Hybrid ARQ Scheme with Concatenated FEC Codes for Wireless ATM," ACM/IEEE Mobicom'97, pp. 131-138, Sep. 1997.

Kalkowski and Burakowski, "Effectiveness of the ATM Services for the TCP Protocol Applications," *IEEE International Conference on Communications* (1996).

Kallel, S. and D. Haccoun, "Generalized Type II Hybrid ARQ Scheme Using Punctured Convolutional Coding," *IEEE Transactions on Communications*, vol. 38, No. 11, pp. 1938-1946, Nov. 1990.

Kallel,, S, "Efficient Hybrid ARQ Protocols with Adaptive Forward Error Correction," *IEEE Transactions on Communications*, vol. 42, pp. 281-289, Feb. 1994.

Manske and Goldberg, "OBVI: Hierarchical 3D Video-Browsing," *ACM Multimedia 98—Electronic Proceedings*, pp. 1-15, Nov. 2, 1998.

Moldeklev and Gunningberg, "Deadlock Situations in TCP over ATM," *IFIP Workshop for High Speed Networks*, Vancouver, B.C., Canada (Aug. 1994).

Moore, Mark, "Netro: ATM to Wireless Networks," *PC Week*, vol. 14, No. 3, p. 77, Jan. 20, 1997.

Nanda, et al, "A Retransmission Scheme for Circuit-Mode Data on Wireless Links," *IEEE Journal of Selected Areas in Communications*, Oct. 1994.

Netravali et al, "Design and Implementation of a High-Speed Transport Protocol," *IEEE Transactions on Communications*, Nov. 1990.

Netro Corporation, The Wireless ATM Company Fact Sheet, May 13, 1997.

Netro Corporation, The Wireless ATM Company Corporate Profile, pp-1-5, May 15, 1997.

Pasternak, "Transmission of ATM and Frame Relay Traffic Using Line of Sight Radio Links," Netro Corporation, Rev. 5, pp. 1-17, A-I-A-7, May 10, 1996.

Pasternak, "Wireless ATM and Frame Relay Network Access," Netro Corporation, Rev. 1, pp. 1-10, Apr. 12, 1996.

Pate, Kelly, "California Firm Aims to Bring ATM Protocol to Wireless Industry," *Radio Comm. Report*, p. 13, Jan. 13, 1997.

WAIVLink Product Brief—Wireless ATM & IP Virtual Link (two page brochure) SRC. Atlanta, Georgia, (undated).

Turbolink™ Product Brief, SRC, Atlanta, Georgia, (two page brochure (undated).

"TurboLink Technical Description," Version ROCO, SRC (Sep. 11, 1998).

"A New ATM Adaptation Layer for UDP/IP over Wireless ATM Networks," Document No.: ATM_Forum/98-0110 R1 (undated).

"Error Control for Wireless Links," Document No. ATM_Forum/98-0203 (undated).

Akyildiz and Joe, "A New ARQ Protocol for Wireless ATM Networks," *IEEE International Conference on Communications*, Jun. 1998.

Akyildiz, et al., "A Survivable Data Link Protocol for Wireless ATM Networks," *Technical Report*, (Jul. 1997).

Ayanoglu et al, "Forward Error Control for MPEG-2 Video Transport in a Wireless ATM LAN," *Mobile Networks and Applications*, pp. 245-257, 1996.

Ayanoglu, et al., "AIRMAIL—A Link Layer Protocol for Wireless Networks," *ACM Journal of Wireless Networks*, Feb. 1995, pp. 47-60.

Balakrishnan, et al., "A Comparison of Mechanisms for Improving TCP Performance over Wireless Links," *ACM SIGCOMM*, pp. 256-269 (Aug. 1996).

Berlekamp, et al., "The Application of Error Controls to Communications," *IEEE Communications Magazine*, vol. 25, No. 4, pp. 44-57, Apr. 1987.

Caceres and Iftode, "Improving the Performance of Reliable Transport Protocols in Mobile Computing Envrionments," *IEEE Journal on Selected in Communications*, vol. 13, No. 5, pp. 850-857 (Jun. 1995).

Cain and McGregor, A Recommended Error Control Architecture for ATM Networks with Wireless Links: *IEEE Journal on Selected Areas in Communications*, vol. 15, No. 1, pp. 16-28 (Jan. 1997).

Draft New ITU-T Recommendation I.363.2, "B-ISDN ATM Adaptation Layer Type 2 Specification," *CCITT SG 13*, Feb. 1997.

Durkin, James "A Reliable Wireless ATM System" (undated).

"Broadband/New Line of Sight Technology—Netro Offers Wireless ATM Connections," (undated).

NetworkWorld, "New Cisco 3800 mux boosts fledgling voice plan," Apr. 7, 1997, vol. 14, No. 14.

Business Wire, "Netro Corporation Announces the AirMAN Product Family, Industry's First ATM and Frame Relay Wireless Networking Systems; Revolutionary Technology Offers Telecom Carriers a Fiberless" Alternative, Jan. 15, 1997

"Wireless ATM Long Distance Network," *Elektronik*, B02594D, Apr. 1, 1997.

http://www.lucent.com/dns/products/ac120.html Data Networking, Pathstar™ Access Concentrator 120 (12 pages).

Comsat Laboratories Brochure, ATM Link Accelerator™ (ALA-2000™), Jul. 1997.

Comsat Laboratories Brochure, ATM Link Enhancer™ (ALE-2000™), Jul. 1997.

Comsat Laboratories Brochure, CLA-2000™/Frame Relay, Comsat Link Accelerator™, Mar. 1998.

Comsat Laboratories Brochure, CLA-2000™/Internet, Comsat Link Accelerator™), Mar. 1998.

Ayanoglu et al, "Forward Error Control for MPEG-2 Video Transport in a Wireless ATM LAN," *Mobile Networks and Applications*, pp. 245-257, 1996.

Balakrishnan, et al., "A Comparison of Mechanisms for Improving TCP Performance over Wireless Links," *ACM SIGCOMM*, pp. 256-269 (Aug. 1996).

Caceres and Iftode, "Improving the Performance of Reliable Transport Protocols in Mobile Computing Environments," *IEEE Journal on Selected in Communications*, vol. 13, No. 5, pp. 850-857 (Jun. 1995).

Durkin, James, "Utilizing Leading Edge Management Technologies within the Tactical Environment," *MILCOM 1996 Proceedings*, Oct. 1996.

Halsall, F., *Data Communications, Computer Networks and Open Systems*, Addison-Wesley, 1996.

J. Hagenauer, "Rate-Compatible Punctured Convolutional Codes and their Applications," *IEEE Transactions on Communications*, vol. 36, No. 4, pp. 389-400, Apr. 1988.

Joe, "An Adaptive Hybrid ARQ Scheme with Concatenated FEC Codes for Wireless ATM," ACM/IEEE Mobicom'97, pp. 131-138, Sep. 1997.

Kalkowski and Burakowski, "Effectiveness of the ATM Services for the TCP Protocol Applications," *IEEE International Conference on Communications* (1996).

Kallel, S. and D. Haccoun, "Generalized Type II Hybrid ARQ Scheme Using Punctured Convuolutional Coding," *IEEE Transactions on Communications*, vol. 38, No. 11, pp. 1938-1946, Nov. 1990.

Kallel,, S, "Efficient Hybrid ARQ Protocols with Adaptive Forward Error Correction," *IEEE Transactions on Communications*, vol. 42, pp. 281-289, Feb. 1994.

Moldeklev and Gunningberg, "Deadlock Situations in TCP over ATM," *IFIP Workshop for High Speed Networks*, Vancouver, B.C., Canada (Aug. 1994).

Nanda, et al, "A Retransmission Scheme for Circuit-Mode Data on Wireless Links," *IEEE Journal of Selected Areas in Communications*, Oct. 1994.

Netravali et al, "Design and Implementation of a High-Speed Transport Pprotocol," *IEEE Transactions on Communications*, Nov. 1990.

Paul et al, "An Asymmetric Protocol for Digital Cellular Communications," *IEEE INFOCOM'95*, pp. 1053-1062, 1995.

Perloff and Reiss, "Improvements to TCP Performance in High-Speed ATM Networks," *Communications of the ACM*, vol. 38, No. 2 (Feb. 1995).

Postel, "Transmission Control Protocol," *RFC 793* (Sep. 1981).

Raychaudhuri, D., "ATM Based Transport Architecture for Multiservices Wireless Personal Communications Networks," *IEEE Journal on Selected Areas in Communications*, Oct. 1994.

Romanow and Floyd, "Dynamics of TCP Traffic over ATM Networks," *IEEE Journal on Selected in Communications*, vol. 13, No. 4, pp. 633-641 (May 1995).

Scholz, J. and P. Cassidy, "The Operation o f TCP and UDP Protocols over ATM Radio Links," *Technical Report*, Jan. 1995.

Sklar, Digital Communications, Fundamentals and Applications, *Prentice Hall*, pp. 460-464 (1988).

Tesfai and Wilson, "FEC Schemes for ATM Traffic over Wireless Links," *IEEE International Conference on Communications*, pp. 948-953, Aug. 1996.

Akyildiz, et al., "A Survivable Data Link Protocol for Wireless ATM Networks," *Technical Report*, (Jul. 1997).

Draft New ITU-T Recommendation I.363.2, "B-ISDN ATM Adaptation Layer Type 2 Specification," *CCITT SG 13*, Feb. 1997.

ITU-T Recommendation I.363, "BISDN ATM Adaptation Layer Specification," *CCITT SG 13*, Mar. 1993.

Jakes, "Microwave Mobile Communications," *Wiley*, 1974 (Reissued by IEEE Press, 1994).

Schwartz, M., *Telecommunication Networks: Protocols, Modeling and Analysis*, Addison-Wesley, 1987.

Simon, et al., Digital Commication Techniques, Signal Design and Detection, *Prentice Hall*, pp. 856-860 (1995).

Proakis, J. G., *Digital Communications*, McGraw-Hill, 3rd edition, 1989 (Table of Contents).

* cited by examiner

SYSTEMS AND METHODS FOR ASYNCHRONOUS TRANSFER MODE AND INTERNET PROTOCOL

CROSS-REFERENCE TO RELATED APPLICATIONS

This application claims priority under United States law to U.S. provisional application Ser. No. 60/100,618, filed Sep. 16, 1998, which document is hereby incorporated in its entirety by this reference.

BACKGROUND OF THE INVENTION

1. Field of the Invention

This invention is directed to error-prone communications networks and, more particularly, to a system for providing protocol-independent, adaptive error-correction that applies to both wireless asynchronous transfer mode or internet protocol networks.

2. Background

The need for interoperability among computing and communications equipment has led to the adoption of various communication networking standards. Two of the more popular standards are Asynchronous Transfer Mode ("ATM") and the Internet Protocols ("IP"), including Transmission Control Protocol ("TCP"). ATM is a connection-oriented non-reliable protocol that was designed with an extremely fast and reliable transmission medium in mind. TCP is a reliable, connection-oriented sliding-window protocol that uses positive acknowledgments.

ATM is a communications networking technology that carries information (including voice, video, and data) in 53-byte segments known as "cells." The fixed-length cell allows a network to carry any type of information within the cell and also provide stringent service qualities that can differ by application. ATM is asynchronous in the sense that the recurrence of the cells containing information from an individual user is not necessarily periodic. ATM is distance-independent and may be deployed in both local area networks ("LANs") and wide area networks ("WANs").

ATM networks may be built from many different kinds of physical medium. ATM networks may use copper wire, coaxial cable, fiber, wireless, and even satellite links. The physical medium choice for an ATM network is dependent upon the existing physical medium being used, the speed requirements, tools and test equipment, right-of-way, and budget. ATM does not provide for correction of errors during the transmission of information. The end equipment or end-user application typically corrects for the corrupted (or errored) information, often via retransmission, but this correction causes delay. Therefore, choosing an ATM medium that minimizes potential damage to the information being transmitted is important, especially when distances are long and retransmissions have a greater impact on application performance and network congestion.

A transmission protocol is the set of rules guiding the exchange of information on the physical medium. Some common transmission protocols that ATM operates over are DSL, T1, E1, T3, E3, and SONET/SDH.

ATM "adaptation" provides a set of instructions for packing user information into the ATM cell. Adaptation is performed by an ATM Adaptation Layer ("AAL"). Each different type of information, such as voice, video, and computer transmissions can have a different packing scheme, depending on its transportation requirements. The 53-byte ATM cell is typically not large enough to carry most communication exchanges, so the user-information must be broken up to fit into the fixed-length cells. This slicing is known as "segmentation." "Reassembly" puts all the pieces back together again at the receiving end.

The cells travel on the selected transmission protocol using known, end-to-end routes identified as virtual connections. A virtual connection defines a logical networking path between two endpoints on the network, and the ATM cells going from one point to the other travel over this connection. Virtual connections are logical because they are defined in software or in the memory of the networking devices. An ATM network may have two types of virtual connections, depending on the addressing used to switch the traffic. A virtual channel connection ("VCC") uses all the addressing bits of the cell header to move traffic from one link to another. The VCC is formed by joining a series of virtual circuits which are the logical circuits uniquely defined for each link of the network. A virtual path connection ("VPC") uses the higher order addressing bits of the cell header to move traffic from one link to another. A VPC carries many VCCs within it. The VPC is formed by joining a series of virtual paths which are the logical groups of virtual circuits uniquely defined for each link of the network. Each ATM cell-header contains a virtual circuit indicator ("VCI") and a virtual path indicator ("VPI") which are locally-significant switching labels that are unique at each ATM interface, and allow individual ATM cells to be routed along the correct end-to-end VPCs and VCCs.

ATM is a connection-oriented networking technology that uses label multiplexing in order to provide both Quality of Service (QoS) guarantees and statistical multiplexing gains. The allocation and sharing of resources is handled on a connection-by-connection basis in an ATM network, through the definition of a traffic contract and an assigned quality of service ("QoS"). The traffic contract of each connection is defined by selecting the service category and associated bandwidth rate. The selected service category and bandwidth rate determines the supported QoS.

ATM supports various classes of service, known as service categories, to support different applications with different levels of performance. The assigned service category of each connection determines how the network prioritizes and allocates resources during a transmission. Each virtual connection (VCC or VPC) in an ATM network has a service category.

Since ATM networks are connection-oriented, a connection-setup phase occurs before the flow of user-data begins. During connection-setup, the user may signal various Quality of Service ("QoS") parameters and traffic characteristics to the network via the User-Network Interface ("UNI") protocol. For end-to-end transmission, the sender segments the transmitted user-data into ATM cells. Each of those 53 byte ATM cells has a five-byte cell-header, and can carry up to 48 bytes of user-data. Hence, the QoS parameters are cell-based ones, such as Cell Transfer Delay ("CTD"), Cell Delay Variation ("CDV") and Cell Loss Ratio ("CLR").

If an ATM user requests a given QoS, or traffic contract, from an ATM network then that user must also supply the traffic characteristics for that connection to the network. The network then does Call Admission Control ("CAC") based on the network's CAC algorithm, the requested QoS, those traffic characteristics and the contracted QoS for other existing connections. If the network can provide the requested QoS, without violating the contracted QoS for the existing connections, then it usually accepts the new connection. Otherwise, it typically rejects that connection.

ATM supports several service categories that are optimized for different types of multimedia datastreams. Constant Bit Rate ("CBR") service is intended for predictable traffic sources such as PCM-coded voice. As such, CBR users want end-to-end guarantees for CTD, CDV and CLR. Variable Bit Rate ("VBR") service is intended for bursty data services that have predictable values for their peak and average data rates. One example is statistical multiplexing of voice streams that use silence detection. Those streams only produce voice samples when the speaker is active. Hence, the average bit-rate is only about 40% of the peak bit-rate. The ATM Forum further differentiates between real-time VBR ("rt-VBR") that requests CTD, CDV and CLR guarantees, and non-real-time VBR ("nrt-VBR") which only requests a CLR guarantee. ATM Available Bit Rate ("ABR") service makes use of the bandwidth left over from CBR and VBR services. As discussed above, the QoS objectives for CBR and VBR traffic are achieved primarily by resource reservation. In contrast, ABR service uses flow control to attempt to maximize the ABR throughput, and minimize the ABR cell-loss, without affecting the previously guaranteed QoS for CBR and VBR traffic. Finally, Unspecified Bit Rate (UBR) service provides no QoS guarantees. It is similar to traditional best-effort traffic in existing IP (Internet Protocol) networks.

The progress towards ATM transport in fixed networks has already begun. It can be expected that new applications will evolve that fully exploit all the capabilities of the ATM transport technology. Users will get used to this new service level and require that the same applications be able to run over error-prone communications networks, such as wireless links. To make this possible, a wireless interface must be developed to support ATM quality of service parameters. The benefits of a wireless ATM access technology should be observed by a user as improved service and improved accessibility. By preserving the essential characteristics of ATM transmission, wireless ATM offers the promise of improved performance and quality of service, not attainable by other wireless communications systems like cellular systems, cordless networks or wireless LANs. In addition, wireless ATM access provides location independence that removes a major limiting factor in the use of computers and powerful telecom equipment over wired networks.

TCP/IP is a family of protocols tailored to address specific applications within an internet. These protocols fall within various layers of the OSI ("Open Systems Interconnection) protocol stack.

Subnetworks are managed at the physical and data link layers. While these layers are not part of the TCP/IP protocol, they do interact with the protocol stack. For example, to reach an IP address, the IP address must first be translated into a Local Area Network ("LAN") machine address.

Internetworking is managed by the IP protocol at the network layer. IP does not support error control, so it relies on another protocol, such as TCP, for this function. These protocols and others encapsulate data into envelopes referred to as protocol data units. From the transport level to the network layer (i.e., from TCP to IP), the PDU is referred to as a segment. A datagram refers to PDUs passed from the network layer down to the data link layer. Once a data unit has passed through the various layers, it is considered a frame. Once the data unit has been passed over the network, it is referred to as a packet.

Employing protocols such as ATM and TCP/IP over error-prone communications networks, such as wireless networks, is difficult because these protocols were designed for optimal efficiency in wired networks having different transmission characteristics. Two of these characteristics are significant as they relate to the use of these protocols in wireless environments. First, wireless media are more susceptible to unwanted noise and interference. Thus, the bit error rate ("BER") of wireless media is often several orders of magnitude higher than that of wired media. Second, transmission of information over geosynchronous earth orbit ("GEO") satellites introduces a round trip signal propagation delay of approximately 500 ms. As a result, existing Automatic Repeat Request ("ARQ") protocols, such as TCP perform poorly.

Since ATM was designed to perform over extremely reliable transmission media, neither ATM nor any of the standardized AALs provide an error correction mechanism. The ATM layer discards any cells with errored cell headers. Similarly, most AALs also discard any errored AAL PDUs, and rely upon higher layers to correct errored data. Since error correction is not applied at each link, errors may only be detected at the endpoints of communication. When one of the links is a radio-frequency ("RF") link, the probability of errors increases and the efficiency of the communications channel decreases. In that case, local retransmissions across the RF link may significantly enhance the end-to-end efficiency of the communications channel.

TCP/IP employs certain algorithms that make the protocol well-behaved and efficient in a terrestrial network. These algorithms perform poorly, however, over high-delay, error-prone wireless or satellite communication channels. Members of the TCP over Satellite ("TCPoS") working group of the Internet Engineering Task Force have identified four network congestion control algorithms among the shortcomings related to the implementation of TCP over wireless communication media: (1) Slow Start; (2) Congestion Avoidance; (3) Fast Retransmit and Fast Recovery; and (4) Selective Acknowledgment.

The Slow Start Algorithm is designed to keep a data sender from overwhelming a communications link by only sending new packets at a rate equal to that at which the sender receives acknowledgments for transmitted data. The sender starts by sending a single packet and doubles the number of additional packets sent each time an acknowledgment is received until it receives the advertised window size of the receiver. The time needed for the sender to reach a state of maximum channel utilization is already significant in terrestrial, wired networks. Satellite transmission increases this time and degrades performance by increasing the acknowledgment round trip time.

The Congestion Avoidance algorithm assumes that a time-out occurs due to packet loss from link congestion. In a wired network, this assumption may be valid. In a wireless environment, data can be lost due to RF noise and interference. Upon detection of network congestion, the algorithm causes the sender to reduce its rate and then increase its rate in a linear fashion in response to acknowledgments. However, multiple packet loss within the current congestion window triggers Slow Start, which may reduce the transmitter's window size back to one. As such, in a wireless network, the loss of packets may cause TCP to continually return to the Slow Start and, therefore, never achieve maximum efficiency.

The Fast Retransmit algorithm uses duplicate acknowledgments from the receiver to determine that a segment was lost. The sender will then initiate the Congestion Avoidance algorithm. While an advantage over Slow Start, Fast Retransmit is not widely available for certain platforms.

The Selective Acknowledgment algorithm provides the sender an acknowledgment for all segments arriving without error. This improves performance by allowing the sender to resend only lost segments and not all unacknowledged segments. Like Fast Retransmit, however, Selective Acknowledgment is not yet available for all platforms.

SUMMARY OF THE INVENTION

This invention involves protocol-independent error-control systems and methods that overcome certain problems associated with error-prone communications networks, such as prior wireless ATM and IP systems. Specifically, the invention is a protocol-independent system or method that improves the performance of traditional network-protocol data-transmission over wireless or other highly-errored communications links. The invention includes several components that assist in providing more reliable data transmission between endpoints: (1) An ATM adaptation layer that supports quality-critical and time-critical data; (2) a rate converter that uses a priority scheme to adjust the data rate for different types of data; and (3) a protocol-independent error-control subsystem that implements a data link protocol optimized for error-prone links, and capable of recognizing traffic from many kinds of network sources. The protocol-independent error-control subsystem or method may be used alone or in combination with the ATM adaptation layer and/or the rate converter.

ATM Adaptation Layer:

The ATM adaptation layer ("AAL") may be implemented at both the receiving and transmitting end points with segmentation occurring at one end point and reassembly occurring at another. The AAL includes two sublayers. One sublayer implements end-to-end error control so that another layer can pass error-free data up to the TCP layer. The first sublayer transforms the data into a protocol data unit and divides the data unit into multiple "ARQ" units. The ARQ units are of variable sizes and their lengths are updated dynamically based, e.g., upon the end-to-end path bit error rate. This dynamic updating improves the throughput efficiency. In addition, control packets transmitted by the receiver are used by the transmitting endpoint to mark data units as successfully transmitted. The second sublayer carries portions of the ARQ data unit.

Rate Converter:

Data from the transmitting end point may be sent to an optional rate converter. The rate converter allows available link-bandwidth to be allocated efficiently. More particularly, available bit rate ("ABR") or other calls are allocated available link-bandwidth according to a weight-based priority scheme. The rate converter assigns each connection a weight factor in accordance with the connection's priority. Higher priority connections have a larger weight factor. The bandwidth that is allocated to a connection is based on the available bandwidth and the sum of all priority-based weights. As a result, higher priority ABR connections are assigned a greater proportion of the available link-bandwidth. This efficiency reduces data loss associated with limited link-bandwidth.

Protocol-Independent Error Control System and Methods:

Data from the optional rate converter may be transmitted to a protocol-independent error-control subsystem. Or, the protocol-independent error-control system may be inserted between a traditional network interface and a wireless transmission/reception device, such as a modem or a radio. The system recognizes traffic from the network and separates the traffic into multiple data streams. The system then adaptively applies error correction based on the traffic type and/or quality of service requirements, and also the current wireless-link conditions. In most networks, the level of error control is usually based on static worst-case communications link conditions. In contrast, this adaptive approach allows the overhead and redundancy used by the error-control function to be reduced when link conditions are good, thereby improving wireless bandwidth utilization over long time periods.

The protocol-independent error-control system includes a protocol converter module and a protocol-independent error-control module. The protocol-converter module provides an interface to a traditional network device. Data from the network device is then separated according to traffic type and/or QoS ("Quality of Service") requirements. The protocol-independent error-control module implements an automatic retransmit request ("ARQ") protocol that uses a selective-repeat, sliding-window retransmission protocol. To minimize processing overhead, the protocol-independent error-control module uses a variable packet-size and periodic control-messages. The packet size is chosen based on the time-varying conditions of the error-prone communications channel (e.g., wireless channel). In addition, the protocol-independent error-control module uses a forward error correction ("FEC") scheme. The forward error correction scheme encodes redundancy into data for transmission such that errors may be detected and corrected by the receiver without requiring retransmission.

Summary

The invention, as broadly described herein, is a system for providing error control for a data network comprising: a first Asynchronous Transfer Mode adaptation layer for delivering quality-critical data; a second Asynchronous Transfer Mode adaptation layer for delivering time-critical data; a rate converter for allocating bandwidth used by at least one of the time-critical or quality-critical data according to a priority scheme; a protocol converter module that separates network data traffic by data type and/or QoS requirements; and a protocol-independent error-control module receiving the separated data traffic, encoding the data, and outputting the data to a wireless transmission device, for subsequent reception, decoding and combining at the receiver.

Skilled persons will recognize that the systems and methods described in this document may be deployed within or as a part of various types of devices or software, including (a) a network interface card; (b) a component of a network element including a switch, router, or access concentrator; (c) a radio; (d) a modem; (e) a transceiver; (f) a chipset coupled to driver software; and (g) an industry standard mezzanine circuit card.

Exemplary Applications:

In order to provide an overview of potential applications for the present invention, FIG. 8 will be referenced. FIG. 8 shows: a number of communication originating devices 1 including telephones, personal computers (PCs) and televisions (TVs) coupled together in a private or public network that hooks through a "Turbolink™" platform 3 on which the present invention is deployed. Platform 3 communicates through a wireless transceiver 5 over a datalink 7 to a wireless receiver 6 that sends the received communications to a second "Turbolink™" platform 4. The platforms 3 and 4 may have a chipset coupled to a processor via driver software, an industry standard mezzanine circuit or various network interface cards that interface with the different networks through which the telephones, PCs and TVs provide their data.

As an example application of the error control system and methods of this invention, assume that Sally uses her computer 1 to make a voice call over the Internet to John's telephone 2, which is hooked up to a public telephone network. The Internet formats the data in Sally's call into Internet Protocol packets, which is what Turbolink* platform 3 receives. As an example application of this invention, platform 3 has a protocol converter module that examines the packets to determine (a) whether the data in Sally's call is quality or time critical and (b) the desired quality of service requirement. Voice calls like Sally's are time critical, but not usually quality critical. In other words, participants in a voice telephone call want the digital data making up the call to arrive in the order sent and promptly, but do not care if some of the data gets corrupted because of noise or transmission problems. Platform 3 then converts the IP packets to a generic format.

Based on the quality of service level assigned to Sally's call, platform 3 will use an error correction module to apply forward error correction to Sally's call. Put another way, if Sally has arranged to be provided a particular high quality of service level, the error correction module will apply more or different types of forward error control to minimize transmission errors. (Maximum error correction is not applied to all calls because the error correction codes take up valuable space in the available bandwidth). Also, platform 3 may be monitoring, or receiving measurements concerning, the quality and condition of the wireless link 7 over which it is sending Sally's call. Based on that information, the error correction module may also vary the FEC applied to Sally's call.

For instance, as conditions on the link 7 worsen (e.g., because a rainstorm arrives that makes wireless transmission more error-prone), more or different qualities of FEC may be applied to decrease error rates; as conditions improve, less FEC is applied. The protocol converter and error correction module can repackage the data of Sally's call into a generic packet format and, depending on the desired quality of service or link conditions, change the size of the payload in the packet. At the receiver 6 end of the communication, platform 4 has a protocol converter that will convert the generic packets into a format appropriate to the network that terminates Sally's call to John's telephone. Platform 4 may also decode the data of Sally's call and count any errors in the data, effectively monitoring the quality of the link 7.

As an example of another aspect of the invention, consider the case where Acme company has set up between two of its offices a video conference call over TV devices 1, 2, with simultaneous transfers of files between Acme's PCs 1 and 2. Data file transfer communications tend to be more quality critical since even small transmission errors can render useless the whole communication. Turbolink™ platform 3 will determine that the Acme company's file transfer among PCs 1, 2 is quality critical, while its video conference call among TVs 1, 2 is time critical. Platform 3 will route the time critical data (after the processing described above) directly to the transceiver 5. However, the quality critical data will go through an additional step where it is packaged according to a "retransmit protocol." Quality critical data is retransmitted if no acknowledgment of its receipt is received or if there was an error in its transmission. The number of retransmission attempts may be governed by the quality of service assigned the communication or the link quality. For instance, the error correction module may be instructed to retransmit the file transfer communication that has a high quality of service requirement up to four times before giving up.

These various procedures all help make very efficient use of the bandwidth available over link 7. That is important because as FIG. 8 shows, various devices are competing to get their data over the wireless link 7, which has a limited bandwidth. Another aspect of this invention that may be deployed on platforms 3, 4 is a data rate converter that prioritizes communications and adjusts the bandwidth allocated particular communications based on their priority and the bandwidth available. Thus, the Acme video conference would be given a high priority and a lot of bandwidth, whereas e-mails among PCs 1, 2 would be given a lower priority. This invention thus aims to increase the available bandwidth by (a) ensuring less error-prone communications, (b) optimizing the error correction applied to particular communications or (c) prioritizing communications transmissions. Accordingly, it is an object of this invention to provide a protocol-independent error control system.

It is an additional object of this invention to provide a system that improves performance of traditional network data transmission over highly-errored communications links, such as wireless links.

It is a further object of this invention to provide a system that recognizes traffic from several different network sources.

It is yet another object of this invention to provide a system that adaptively applies protocol-independent error correction.

It is an additional object of this invention to provide a system that adaptively applies protocol-independent error correction based on the traffic type and/or QoS requirements of the data.

It is another object of this invention to provide a system that adaptively applies protocol-independent error correction based on the wireless link conditions.

It is an additional object of this invention to allocate available bandwidth for wireless calls in an efficient manner.

Additional objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

FIG. 14 is a block diagram of an SDLP data-packet.

DETAILED DESCRIPTION

Before describing the drawings and embodiments in more detail, several terms are described below in an effort to clarify the terminology used in this document. Additional and fuller understanding of these terms will be clear upon reading this entire document:

Quality of Service: Quality of Service is defined on an end-to-end basis in terms of various parameters that measure the efficacy of a communication. For instance, for ATM networks, quality of service typically is defined in terms of cell loss ratio, cell transfer delay or cell delay variation, each of which terms are understood by skilled persons.

Generic Packet Format: This phrase refers to a packet format that is not protocol dependent.

Forward Error Correction involves various types of techniques that aim to detect and correct errors in a digital datastream.

Datastream: a datastream refers to digital information organized in any fashion, such as a bit or byte stream or as packetized data.

Reference will now be made in detail to the invention, examples of which are illustrated in the accompanying drawings. Wherever possible, the same reference numbers will be used throughout the drawings to refer to the same or like parts.

Figure 1:
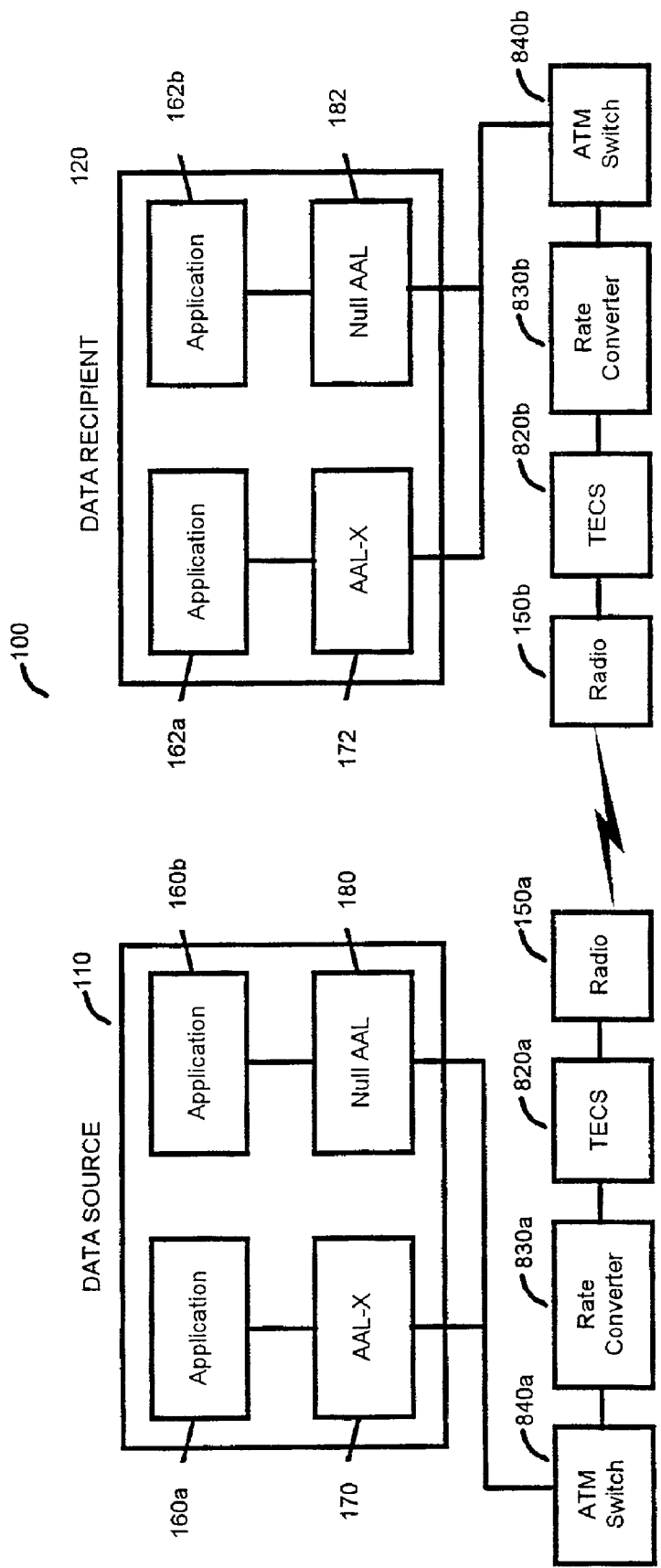
FIG. 1 is a block diagram of a wireless network for transmitting data, according to this invention

FIG. 1 is a block diagram of a wireless network 100 for transmitting data, according to this invention. Network 100 may be, for example, a telephone network, the internet, a local area network ("LAN"), a wide area network ("WAN"), a residential broad band network, a satellite network, or any other network that transmits data across wireless links using radios 150a, 150b or other transceiving devices. Network 100 may further be an Asynchronous Transfer Mode ("ATM") network or an Internet Protocol ("IP") network or a network that includes both IP and ATM elements.

The network 100 includes a data source 110 that creates data for a data recipient 120. The data source 110 and data recipient 120 are collectively termed "endpoints". The endpoints may be any data-creating or receiving device, including, but not limited to a computer (e.g., PC workstation, super computer), cable or xDSL modem, home terminal (set-top boxes or residential gateways), other information sources (such as multimedia devices), or receivers (such as video decoders). An endpoint may also be an internetworking device such as a router or switch. It should be apparent, however, that any device that transmits data may be used. Similarly, the data recipient 120 may be any data-receiving device, including the devices listed above.

The endpoints 110, 120 may include one or more end-user applications 160 that create, send, receive, or process data. The applications 160a, 160b, 162a and 162b may support multimedia traffic, and may support a large range of data-transmission rates. Application 160a involves quality-critical data, and uses a protocol such as TCP. Application 160b involves time-critical data, and uses a protocol such as UDP. TCP is a standard internet protocol that utilizes a retransmission scheme for reliability. UDP is a standard internet protocol that uses a "best-effort" attempt to deliver traffic with a minimum amount of overhead, but does not employ any mechanism for reliable delivery. For purposes of this description, TCP traffic will be treated as "quality-critical" traffic, while UDP traffic will be treated as "time-critical". For quality-critical traffic, reliable delivery is very important. For time-critical traffic, minimal delay is very important.

Data Transmission/ATM Adaptation Layer ("AAL")

Endpoints 110, 120 may include an AAL subsystem that includes two AAL protocols for delivering time-critical or quality-critical traffic. The first AAL protocol, "AAL X" 170 is used to deliver TCP or other quality-critical traffic. The second AAL protocol, "Null AAL" 180, is used to deliver UDP or time-critical traffic Each of these protocols will be discussed in greater detail below. The protocols may be implemented as software that resides on endpoints 110, 120. Alternatively, the protocol may be implemented in hardware installed within endpoints 110, 120, such as a firmware driver on a network interface card.

Figure 2:
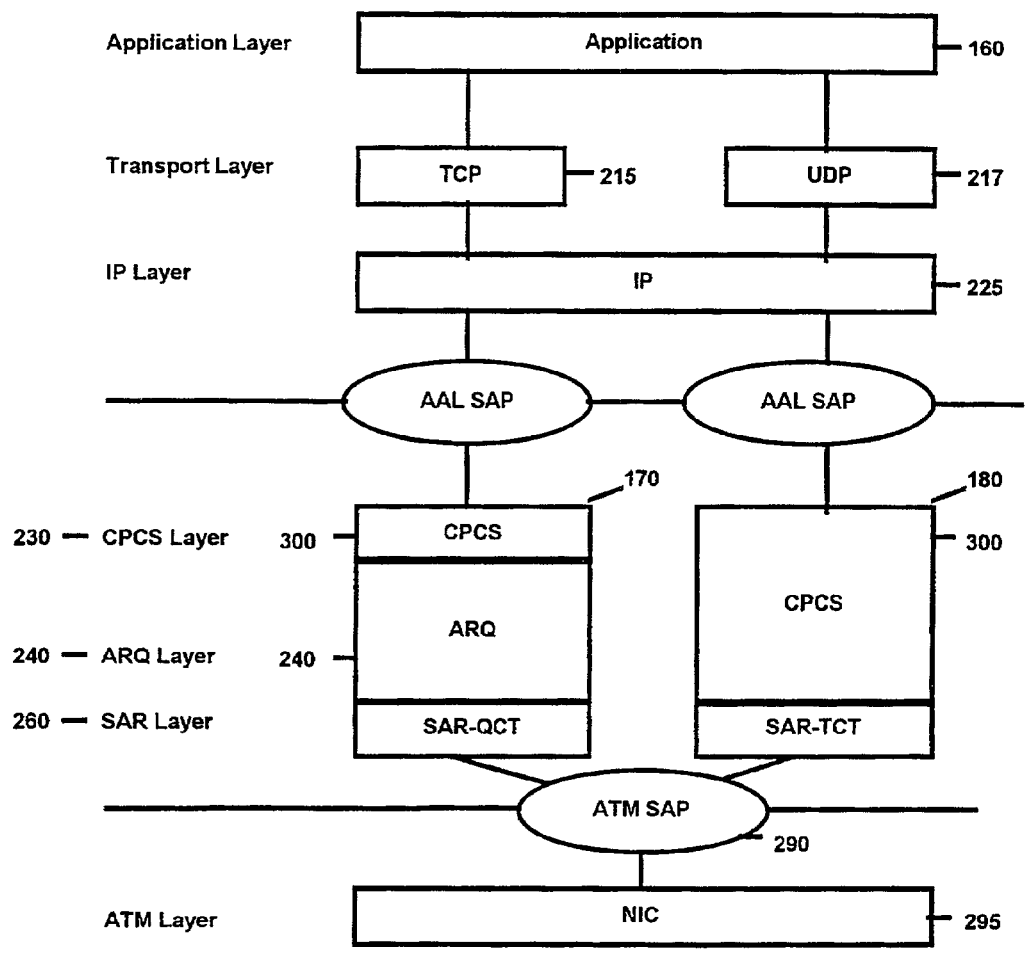
FIG. 2 is a block diagram of the ATM Adaptation Layer subsystem.

FIG. 2 is a block diagram of the AAL protocols 170, 180. These protocols may be divided into multiple OSI layers that encapsulate data contained in IP packets 225. Data from an application 160 is determined to be time-critical or quality-critical. In this embodiment, that determination could use the IP Protocol Type Code, in the IP header, which is 17 for UDP and 6 for TCP. The TCP data 215 is initially encapsulated into an IP packet 225 using standard IP protocol encapsulation methods. TCP or quality-critical data 215 is encapsulated into the IP packet and transmitted to a common part convergence sublayer ("CPCS") 230 of the AAL X protocol 170. UDP or time-critical data 217 is transmitted to a common part convergence sublayer 230 of the Null AAL protocol 180.

Figure 3:
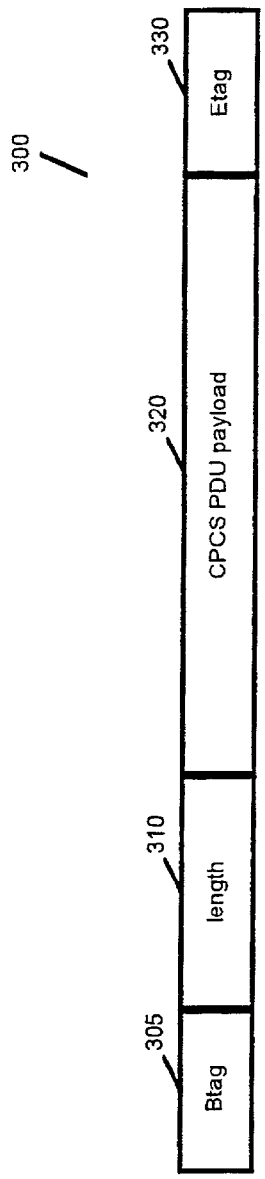
FIG. 3 is a block diagram of the common part convergence sublayer protocol data unit.

The CPCS 230 accepts IP packets 225 from the IP stack. The CPCS 230 extracts the packet type, TCP or UDP, from the packet. The data from the IP packet (the "payload") is then placed into a CPCS protocol data unit ("CPCS-PDU") 300 for further adaptation. The CPCS-PDU format is shown in FIG. 3. The CPCS-PDU 300 includes a header of three bytes containing two fields that denote the beginning of the CPCS-PDU 300. The transmitting endpoint inserts the Beginning Tag (Btag) 305 and the End Tag (Etag) 330 in order for the receiving endpoint to identify each CPCS-PDU. The length field 310 contains a part indicating the length of the entire CPCS-PDU and a part indicating the length of the UDP/IP header. The data contained in the original IP packet is stored in the CPCS-PDU payload field 320.

For TCP data, the CPCS 230 (FIG. 2) passes the CPCS-PDU 300 to an Automatic Retransmit Request ("ARQ") sublayer 240 in the AAL X protocol 170. The ARQ sublayer 240 provides end-to-end retransmission capability for the network. Specifically, the sublayer 240 divides the CPCS-PDU 300 into ARQ protocol data units ("ARQ-PDUs") 400.

Figure 4:
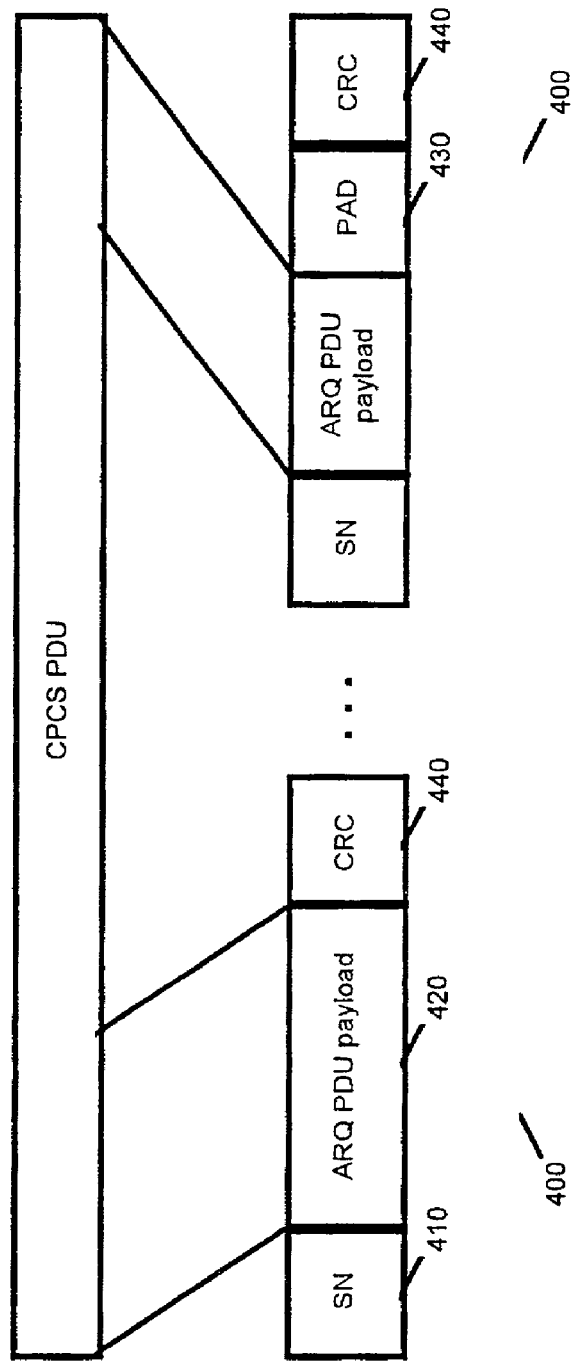
FIG. 4 is a block diagram of the automatic retransmit request ("ARQ") protocol data unit.

FIG. 4 is a block diagram of the ARQ-PDUs 400 that are divided out from a CPCS-PDU. The data unit 400 includes a sequence number ("SN") field 410 that is used to deliver the data units in a particular order. If an ARQ-PDU 400 is lost or in error, then the ARQ sublayer 240 will attempt to re-transmit the data unit 400 with the same SN in its buffer. The field 410 is a 2-byte field, or is preferably large enough to support the size of the flow-control window (i.e., the number of data units that may be sent prior to an acknowledgment being received) needed in satellite networks. A cyclic redundancy check ("CRC-16") field 440 is used to protect the sequence numbers and ARQ-PDU payload.

Figure 6:
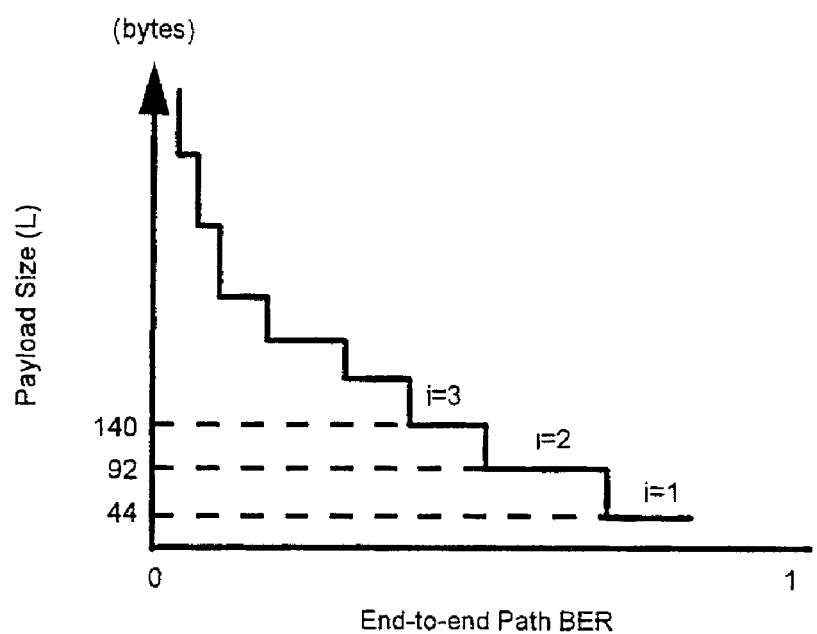
FIG. 6 is a block diagram of a look-up table that shows the payload length as a function of the end-to-end path bit error rate.

The second field 420 is a portion of the original payload having the length, L, where L is a step-function of the end-to-end path bit error rate ("BER"). One possible step-function is shown in FIG. 6. The BER is calculated by the ARQ sublayer 240. That BER calculation may be based upon either the error statistics of the most recently received ARQ-PDUs 400 (e.g., the number of ARQ-PDUs 400 that failed the CRC-16 check within the last X received ARQ-PDUs 400) or the status information contained in the periodic control-packets returned by the receiver 120. The control packets may be conveyed in RM ("Resource Management") cells. The last ARQ-PDU 400 that is divided out from the CPCS PDU 300 will have a length equal to L*, where L* is equal to the remainder of the CPCS-PDU length after being divided evenly. A padding field 430 is added to the last data unit. The length of the padding field is between 0–43 bytes and may be determined by considering the length of the header and trailer of the PDU 400.

Unlike classical ARQ schemes, the ARQ scheme of this invention does not use a retransmission timer. This prevent redundant retransmissions or recovery periods from a timeout mechanism. The packet size varies with the end-to-end path conditions to improve the throughput efficiency. The receiver 120 sends its status to the transmitter 110 on a periodic basis by a control packet, thereby eliminating the timeout mechanism. The control packets, or some sequence of control packets, may provide the error statistics, for the most recently received ARQ-PDUs 400, required by the BER calculation at the transmitter 110.

The ARQ-PDU payload length, L, may be automatically updated by using a look-up table 600, as illustrated in FIG. 6. The table 600 shows the payload length as a function of the end-to-end path BER. The length, L, of the payload is equal to 48*i–4 for i=1, 2, 3, etc., where i represents the sum of the header and trailer of the PDU. Initially, i is set to 1 for the worst case scenario and the transmitter may update the payload length, L, each time it receives the control packets from the receiver 120. Based on the new payload length, the receiver may update the generation rate of control packets.

Figure 7:
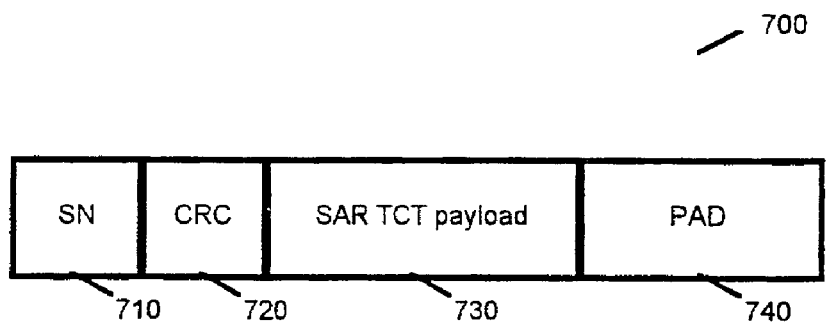
FIG. 7 is a block diagram of a segmentation and reassembly protocol data unit.
Figure 8:
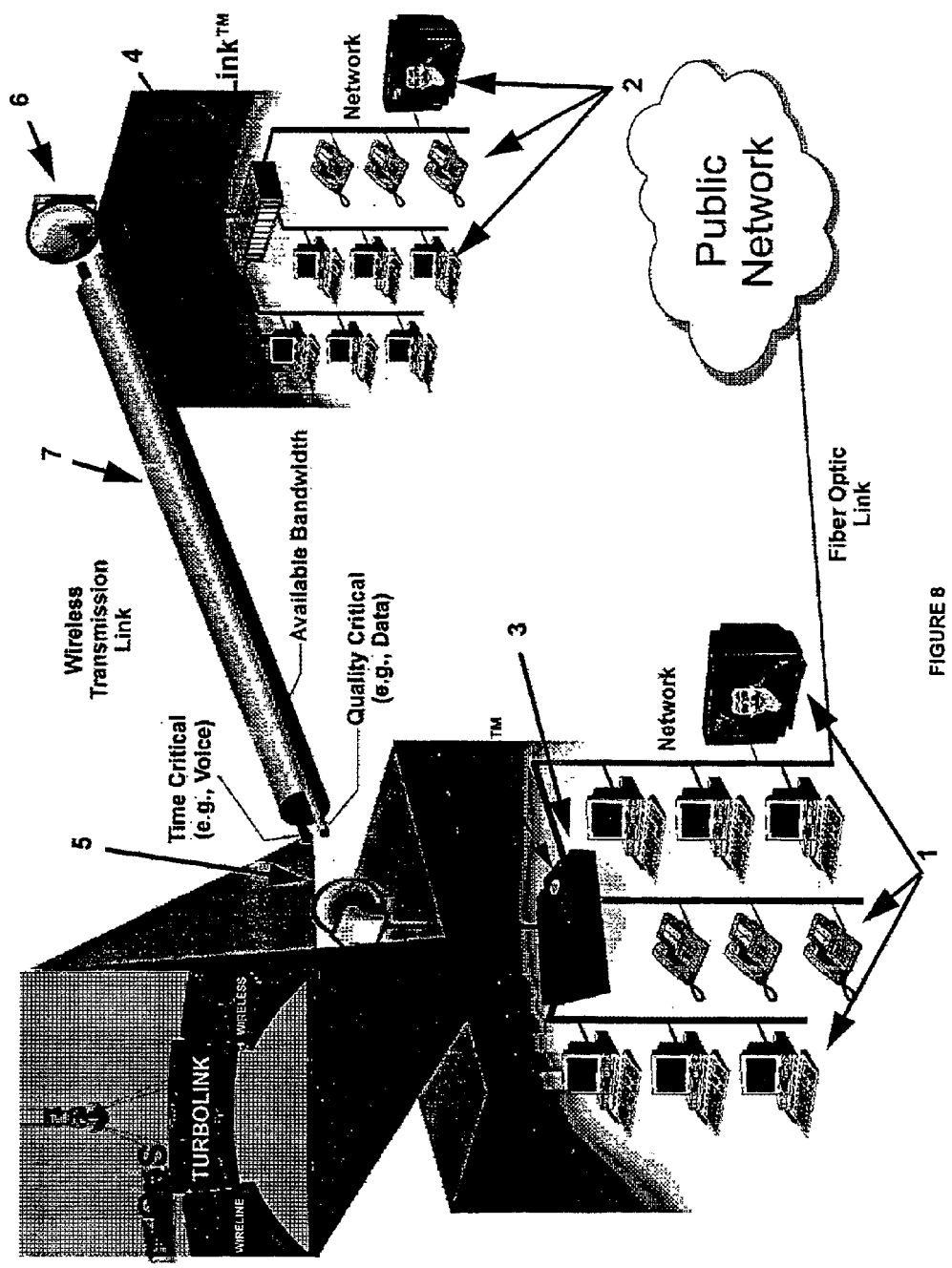
FIG. 8 is a block diagram of how the invention might be used within a network.

The ARQ sublayer 240 (FIG. 2) passes each ARQ PDU 400 to a segmentation and reassembly ("SAR") sublayer 260. For quality-critical traffic, the ARQ-PDU 400 is divided into 48-byte ATM cell payloads. The SAR sublayer 260 then passes the ATM cell payload, to a Service Access Point ("SAP") 290. For time-critical traffic, the CPCS-PDU 230 is divided into 47-byte segments (the "SAR-TCT payload" 730) for insertion into the "SAR-TCT PDU" 700, as illustrated in FIG. 7. This SAR-TCT PDU 700 includes a 4-bit SN 710 and a 4-bit CRC 720 on the SN. The SN 710 and CRC 720 are appended to the 47-byte segment to create a 48-byte unit, which is an ATM cell payload. A padding field 740 of 0 to 46 bytes is appended to the last segment so that the payload 730 plus the padding field 740 is equal to 47 bytes. The SAR sublayer 260 then passes the ATM cell payload, to a Service Access Point 290.

The SAP 290 maintains a table that maps SAR-TCT PDUs 700 and ARQ-PDUs 400 into corresponding Virtual Path Identifiers ("VPIs") and Virtual Channel Identifiers ("VCIs"). The SAP 290 also identifies each VPI/VCI for the type of traffic that it can handle. For ATM cell payloads, the SAP 290 creates a 5-byte ATM cell header and appends it to the received ATM cell payload. The ATM cell payload is then passed to the Network Interface Card ("NIC") 295. Alternatively, the SAP may pass the 48-byte ATM cell payload to a Network Interface Card 295 within the endpoint 110. The NIC would then create the 5-byte ATM cell header. The SAP 290 sets the ATM User-to-User ("AUU") field within the payload type ("PT") field of the ATM cell header to 0 for all but the last cell of a segment. The AAU of the PT field is set to 1 for the last cell of the segment.

Figure 13:
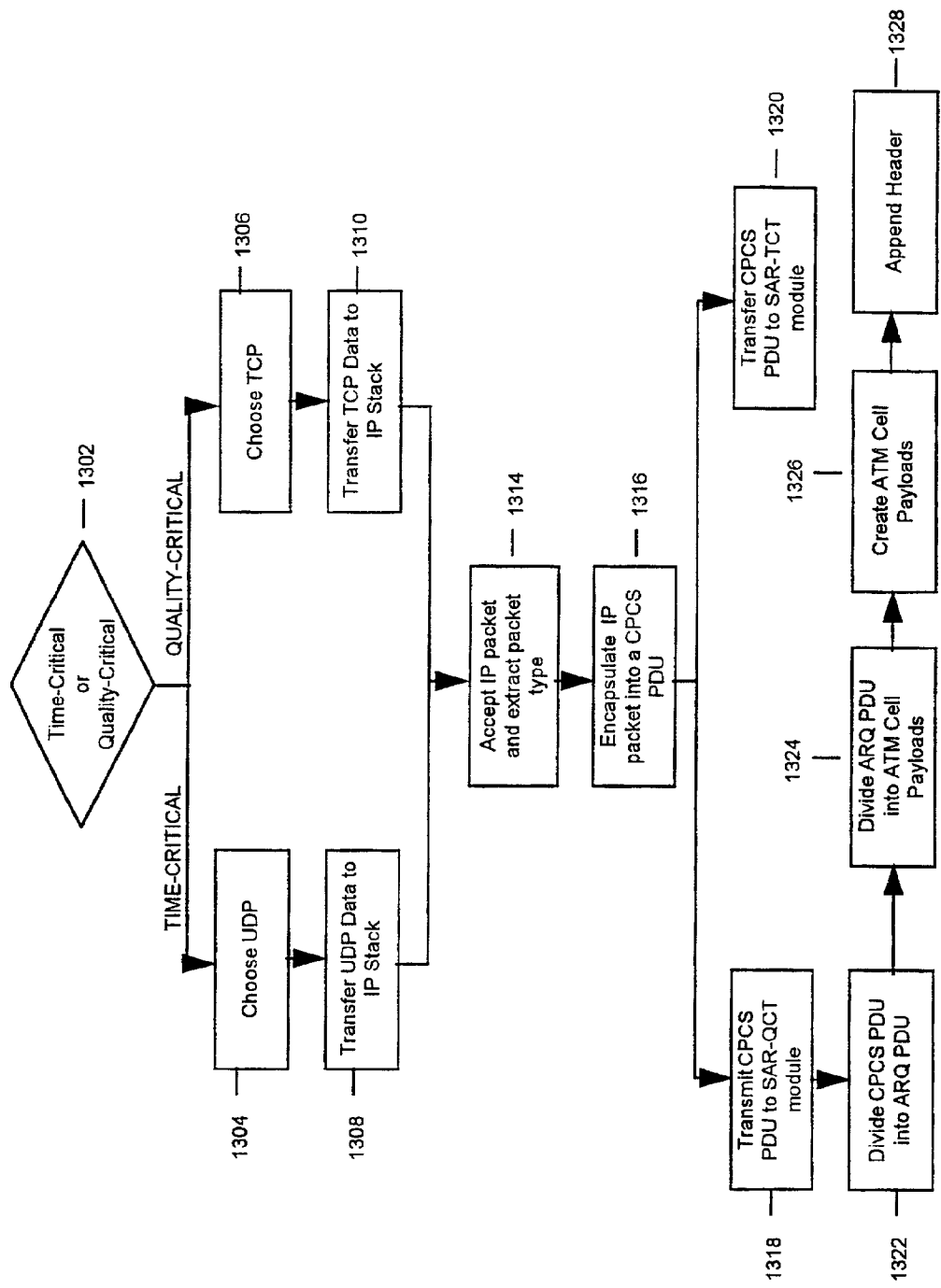
FIG. 13 is a flow chart of the processing of data by the transmitting application and the AAL.

FIG. 13 is a flow chart of the processing of data by the transmitting application 160 and the AAL. In step 1302, the application decides whether the data is quality-critical or time-critical. In this embodiment, TCP is used for quality-critical data in step 1304; while UDP is used for time-critical data in step 1306. In step 1308 the UDP data is transferred to the IP stack. In step 1310, the TCP data is transferred to the IP stack.

In step 1314, an IP packet is accepted and the packet type is extracted. The IP packet is encapsulated into a CPCS PDU in step 1316. If the payload is TCP traffic, it is sent to the SAR-QCT module in step 1318. If the payload is UDP traffic, it is transmitted to the SAR-TCT module in step 1320. In step 1322, the ARQ module divides the CPCS PDU into ARQ PDUs for the SAR-QCT. The SAR QCT divides the ARQ PDU into 48 byte ATM cell payloads for the SAP module in step 1324. (The SAR-QCT module creates 48 byte ATM cell payloads from the ARQ PDU.) The ATM cell payload is passed to the SAP. In step 1328, the SAP appends a 5-byte header that includes the VPI/VCI for the ATM cell.

ATM Rate Converter

The ATM Rate Converter 830 is implemented as a software driver and may be resident in a Network Interface Card of an endpoint or in the ATM switch 840. The Rate Converter 830 allocates bandwidth to ATM traffic via a combination of Available Bit Rate ("ABR") service and a priority-weighted bandwidth-allocation scheme. The International Telecommunication Union ("ITU-T") has defined specifications addressing ATM call priority. This call priority recommendation (Q.2959) (the "Recommendation") is incorporated by reference herein. The Rate Converter 830 and TECS 820 extend the Recommendation as follows.

During the signaling between the endpoints 110 and 120, the call setup message includes an optional Priority Information Element ("IE"). The Priority IE has a length of 10 bytes and specifies priority information in byte 5. One hundred twenty eight priority levels are defined in the IE, although only five priority levels are currently standardized by the ITU-T.

The available bandwidth, $ABR_l$, on a link, l, is equal to the total bandwidth for ATM user-plane traffic on that link, l, minus Sum (PCRs for CBR calls plus SCRs for VBR calls plus MCRs for ABR calls) on that link, l. When a call setup request is received at the ETECS and the available bandwidth is sufficient to accommodate the requested QoS parameters, the ETECS accepts the call. If the bandwidth is insufficient to accommodate the requested QoS parameters, the active bandwidth for all UBR calls is set to zero. If insufficient bandwidth still exists to accommodate the requested QoS parameters, the ETECS enters a priority mode.

The originating endpoint 110 may provide priority information for each call-setup request. If no priority request is provided, the ETECS will specify the lowest priority. An external process provides for screening of the priority request to ensure that the users do not exceed their highest allowed priority-level. During call-setup, the ETECS transports the priority information, contained in the Priority IE, on the Network-to-Network Interface ("NNI") towards the destination User-to-Network Interface ("UNI"), which subsequently delivers the priority information to the destination endpoint 120.

When a priority is specified in the call-setup message, the priority mode of the ETECS works as follows. If the new call has a lower priority than all existing calls and the call-setup message requests ABR service with a Minimum Cell Rate ("MCR") greater than zero (or CBR service with a Peak Cell Rate ("PCR) greater than zero, or VBR service with a Sustained Cell Rate ("SCR") greater than zero), then the call is rejected. If the new call has a lower priority than all existing calls and requests ABR service with MCR=0 then the call is accepted with an allocated bandwidth equal to zero. If the new call has a higher priority than some, or all, existing calls, the ETECS divides the new call between CBR, VBR, and ABR service. For CBR or VBR calls, the ETECS enters a "decrease mode." For ABR calls, the ETECS first enters "decrease mode" and then enters a "reallocate mode."

In the decrease mode, available bandwidth is decreased by the new call bandwidth requirement (i.e., if the new call requests CBR service then the available bandwidth is decreased by the PCR requested by the new call; if the new call requests VBR service then the available bandwidth is decreased by the requested SCR; if the new call requests ABR service then the available bandwidth is decreased by the requested MCR). If the newly-calculated available bandwidth is greater than or equal to zero then the new CBR, VBR or ABR call is accepted, and the ETECS then reallocates the available bandwidth amongst the ABR calls using the priority-weighted allocation algorithm discussed below. Otherwise, the new CBR, VBR or ABR call is rejected, and the available bandwidth is restored to its previous value.

In the reallocate mode, the available bandwidth is reallocated among lower-priority ABR calls using the following priority-weighted bandwidth-allocation algorithm. Each ABR connection is assigned a weight factor, w, in accordance with its connection priority, such that each connection with the same priority level, p, has the same weight factor. Higher-priority connections have a larger weight factor. Thus, for connections i and j: if $p_i > p_j$ then $w_i > w_j$. The available bandwidth, $ABR_l$, on a link, l, is equal to the total bandwidth for ATM user-plane traffic on that link, l, minus Sum(PCRs for CBR calls plus the SCRs for VBR calls plus the MCRs for ABR calls) on that link, l. From the available bandwidth, the amount allocated to an ABR connection i, on link, l, is equal to: $MCR_i + ABR_l * w_i / SUM(w)$, where $MCR_i$ is the Minimum Cell Rate reserved for ABR connection i, $ABR_j$ is the available bandwidth for the link, $w_i$ is the priority based weight of connection i and SUM(w) is the sum of all priority-based weights. If the priority-weighted bandwidth-allocation assigned to ABR connection i is greater than the requested Peak Cell Rate ("PCR") for ABR connection i, the excess available-bandwidth is apportioned to the other ABR connections according to their priority-based weights.

For example, if we have the following:
Available bandwidth for ABR calls=100 Mbps
Connection 1: priority=0 (highest); PCR=80 Mbps; MCR=0 Mbps
Connection 2: priority=2; PCR=50 Mbps; MCR=0 Mbps
Connection 3: priority=2; PCR=20 Mbps; MCR=0 Mbps
Connection 4: priority=4 (lowest); PCR=15 Mbps; MCR=0 Mbps First, the ABR Converter computes the weight factors such that the highest priority connection has the highest weight and the lowest priority connection has the lowest weight, as shown below. Other choices for the weights are also possible, as long as the weights satisfy the condition that for connections i and j: if $p_i > p_j$ then $w_i > w_j$
Number of priorities: 3
Assign weight=3 to Connection 1 (highest)
Assign weight=2 to Connection 2
Assign weight=2 to Connection 3
Assign weight=1 to Connection 4 (lowest)

Next, the ABR Rate Converter computes the initial allocation.
SUM of weights=8
Connection 1: Allocation=3/8*100=37.5 Mbps
Connection 2: Allocation=2/8*100=25 Mbps
Connection 3: Allocation=2/8*100=25 Mbps
Connection 4: Allocation=1/8*100=12.5 Mbps Since the allocation for Connection 3 (25 Mbps) exceeds the PCR (20 Mbps) for that connection, the allocation for Connection 3 is set to its PCR and the remaining allocations are recomputed, as follows, based on the priorities of the remaining ABR calls:
ABR Available bandwidth=100−(PCR for ABR connection 3)=80 Mbs
SUM (weights for ABR connections 1, 2 and 4)=6
Connection 1: Allocation=3/6*80=40 Mbs
Connection 2: Allocation=2/6*80=26.67 Mbs
Connection 3: Allocation=20 Mbs (PCR)
Connection 4: Allocation=1/6*80=13.33 Mbs This apportionment algorithm is run recursively until the allocations for all the ABR connections are less than their PCRs.

Upon release of a call (CBR, VBR or ABR), the increased bandwidth is allocated among all ABR calls using the priority-weighted bandwidth-allocation algorithm. Similarly, during an increase of the link bandwidth, the increased bandwidth is reallocated among all ABR calls using the priority-weighted bandwidth-allocation algorithm. When the link bandwidth is decreased, the decreased bandwidth is reallocated among all ABR calls by using the priority-weighted bandwidth-allocation algorithm.

Transmission Error Control Subsystem ("TECS")

Data from a network device, such as the optional rate converter 830, is passed to the Transmission Error Control Subsystem ("TECS") 820. The TECS 820 provides error control by using a Survivable Data Link Protocol ("SDLP"). The SDLP is a specific form of an ARQ protocol. The SDLP is a selective repeat, sliding window, retransmission protocol that minimizes overhead by: 1) using variable packet sizes; and 2) transmitting periodic control messages from the receiver to the transmitter.

Figure 9:
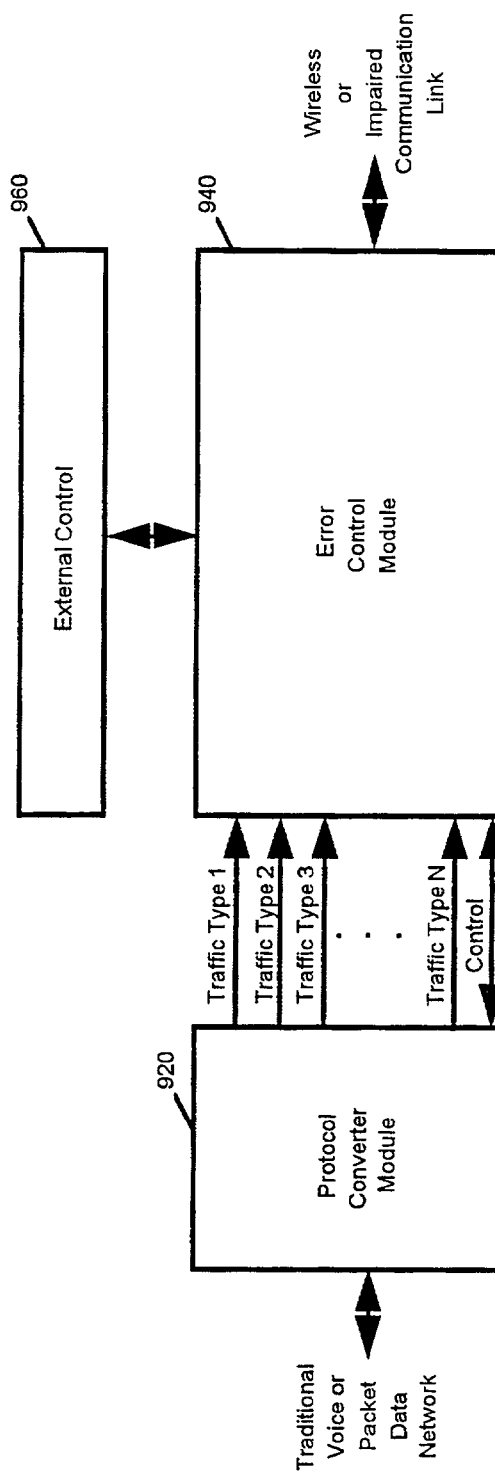
FIG. 9 is a block diagram of the Transmission Error Control System ("TECS").

FIG. 9 is a block diagram of the TECS, according to this invention. The TECS includes two primary components: (1) a Protocol Converter Module ("PCM") 920; and (2) an Error Control Module ("ECM") 940. The PCM provides all of the network or data link protocol-specific functionalities required to interface with a traditional voice or packet data network. The PCM also accepts packets from a network device, such as the rate converter 830. The PCM 920 separates all of the incoming traffic into different traffic types. The ECM 940 provides protocol-independent error correction for the various traffic types transmitted by the PCM. An external controller 960 may be used to program the ECM 940 to apply differing levels of error control to the different traffic types, based on criteria such as their QoS requirements, prior to transmitting the data over the wireless link.

Figure 10:
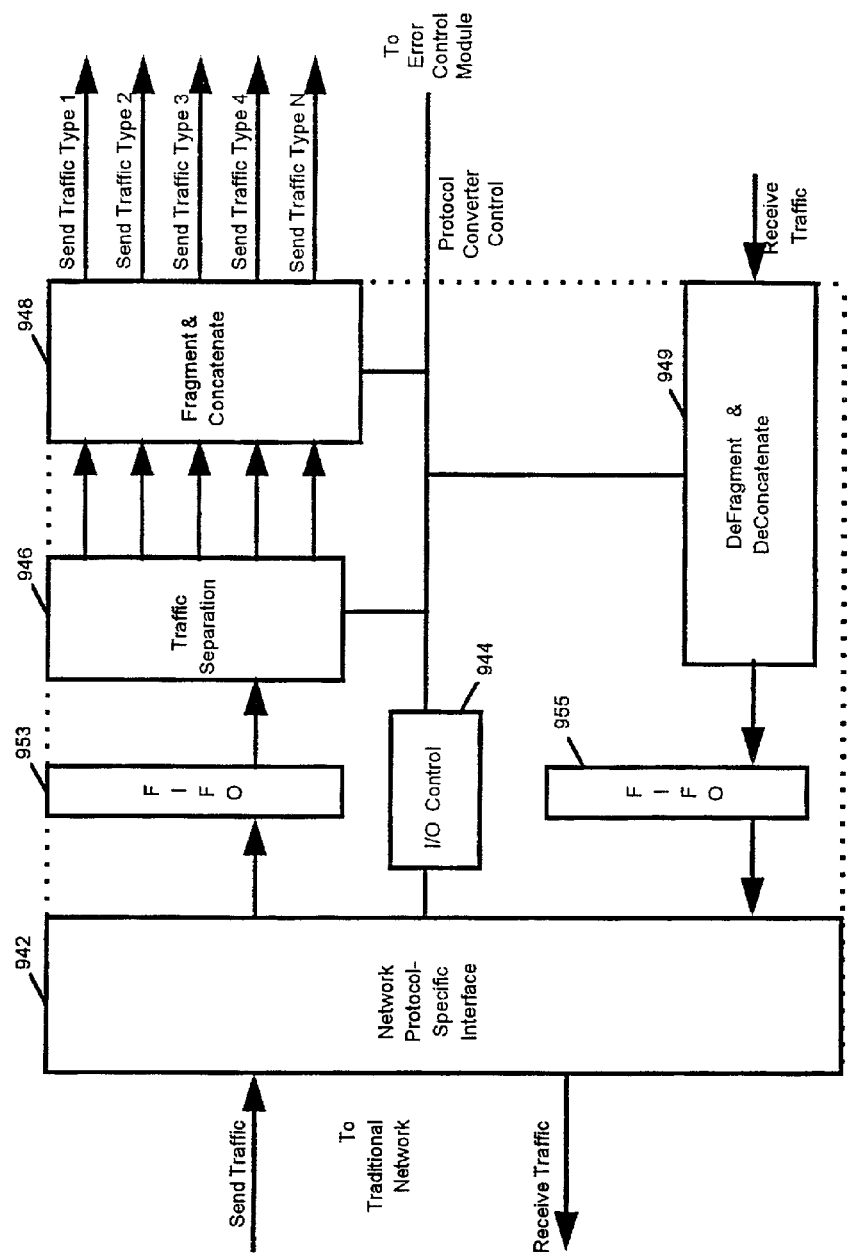
FIG. 10 is a block diagram of a protocol-converter module of the TECS in FIG. 9.

FIG. 10 is a block diagram of one type of architecture for the PCM. The PCM 940 includes several sub-units: (1) a Network Protocol Interface ("NPI") 942; (2) a Network Input/Output Control ("NIOC") 944; (3) Sent Traffic Separator ("STS") 946; (4) Send Fragmentor and Concatenator ("SFC") 948; and (5) Receive Defragmentor and Deconcatenator 949.

The NPI 942 provides the physical, medium access protocol, data link protocol, and network protocol interface to a traditional voice, serial, frame, cell, packet network or ATM rate converter 830. Specifically, the NPI 942 transfers data between an external network device (e.g., a router, NIC or the ATM rate converter 830) and send or receive first-in/first-out ("FIFO") buffers 953, 955.

Upon receiving a data frame, the NPI 942 issues an interrupt for use by the NIOC 944. The NPI physical interface may be fiber-optic, copper, or radio-frequency ("RF"). The NPI data link protocol interface supports encapsulating and decapsulation of data within frames. Some examples of supported protocols are shown in Table 1.

TABLE 1

| Sample Framing Protocols | Sample Network Protocols | Sample Network Devices |
| --- | --- | --- |
| T-1/DS-1 | Internet Protocol | Internet Router |
| T-3/DS-3 | Frame Relay | Frame Relay Access Device |
| ISDN | ATM | ATM Switch |
| HDLC | X.25 | TelCo CSU/DSU |
| LAPB | | PBX |

The NIOC 944 provides timing and control for data transfers between the NPI 942 and the ECM. Following the transmission of the interrupt by the NPI 942, the NIOC 944 reads a data frame from the NPI 942 and places the data frame in the input FIFO 953.

The FIFOs 953, 955 store data from the NPI 942 or the Receive Defragmentor and Deconcatenator 949. Upon receiving data, an empty flag in the FIFO changes from true to false. Following the transition of the empty flag from true to false, the FIFOs 953, 955 provide an interrupt to the STS 946 and the NPI 942, respectively.

The STS 946 awaits the interrupt from the input FIFO 953. The STS then examines the Network payload headers within the received data frames, and determines its traffic type based upon information contained in those headers and a lookup table in the MIB of the ECM 940 (described below). For various network protocols, the STS 946 uses a different method to determine the traffic type. For example, for IP data the type of service, Differentiated Services Code Point, IP Protocol Type, or port number may be used to determine the traffic type. For ATM data, the quality of service requested in the call-setup message and/or the VPI/VCI segment of the ATM cell-header may be used to determine the traffic type. For frame relay data, proprietary quality of service data is used to determine the traffic type. The STS 946 transmits packets or frames in the form of multiple bit streams.

The Send Fragmentor and Concentrator ("SFC") 948 accepts data bytes from the STS 946. The SFC 948 creates Survivable Data Link Protocol ("SDLP") payloads of optimal length for the existing link conditions by fragmenting or concatenating packets/frames. As such, the SDLP packet boundaries need not be aligned with the frame boundaries in the incoming network data units received by the NPI 942. The optimal payload size is obtained from the Control Agent 850 in the ECM 940. The Control Agent 850 and the SDLP format are discussed in greater detail below.

In addition, the TECS 820 uses a periodic control message from the receiver to ensure that a packet is retransmitted only when it is in error. For example, the control message interval, $T_1$ may be given by the maximum of the two quantities (a/m) or d, where a is the round trip delay, m is the control parameter for the control-packet generation, and d is the inter-arrival time. When used over relatively high BER links (i.e., $10^{-5}$ or higher), ARQ protocol performance is sensitive to the packet size used in the transmission. With too large a packet size, the need for retransmission increases. Too small a packet size results in inefficiency due to the fixed overhead required in each packet. Thus, the TECS adapts the packet size based on estimates of the channel condition (e.g., the channel's Bit Error Rate ("BER"). The packet-size adaptation may use either network-specific lookup tables or protocol-specific lookup tables that give the packet size for each range of channel conditions or a formulaic approach for calculating the optimum SDLP-packet size, $L_{opt}$, such as given below.

$$L_{opt} = \frac{-h\ln(1-p) - \sqrt{-4h\ln(1-p) + h2\ln(1-p)}}{2\ln(1-p)}$$

where h is the number of overhead bits per SDLP packet and p is the end-to-end BER.

Figure 5:
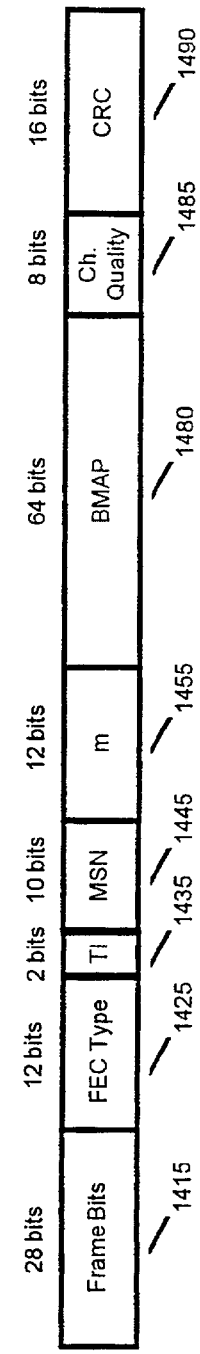
FIG. 5 is a block diagram of a control packet.
Figure 11:
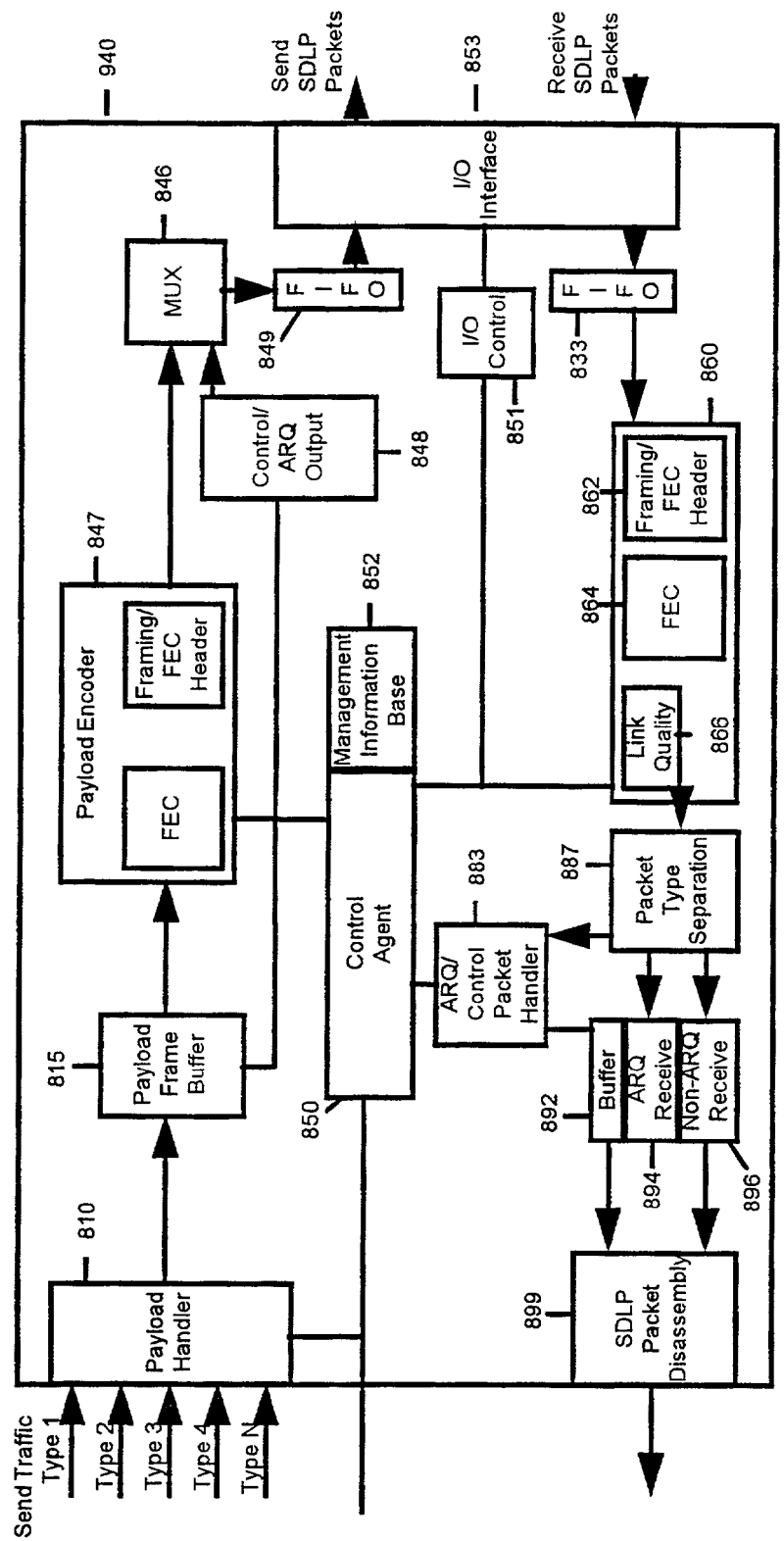
FIG. 11 is a block diagram of a protocol-independent error-control module of the TECS in FIG. 9.

The control packet format is illustrated in FIG. 5. As stated above, the receiver 120 periodically sends control packets to the source 110 for quality-critical traffic. The control packet includes a Frame Bits field that identifies the beginning of the control packet. The FEC type field 1425 indicates the specific FEC code used to encode the data. The traffic indicator field 1435 indicates the traffic type of the data. The MSN field 1445 specifies the sequence number of the packet for which all prior transmitted packets have been received correctly. (Each traffic type uses a different sequence-number space. As such, each packet is identified by the combination of the traffic indicator field and a sequence number.) The number of control packets sent from the receiver to the transmitter per round-trip delay is contained in the m field 1455. The BMAP field 1480 contains a bit field where one bit corresponds to the correct or incorrect reception of a packet. (The least significant bit of the BMAP field refers to the SDLP packet (of the type indicated by the TI field 1435) with a sequence number= (MSN+1) (modulo the size of the sequence number range.) An estimate of the channel BER measured at the receiver is specified in the Channel Quality field 1485. Finally, a CRC 1490 is used to detect errors during transmission of the control packet. These field sizes are examples. Different wireless networks and network protocols may require different values. The ECM is illustrated in FIG. 11. The central process in the ECM is a Control Agent ("CA") 850. The CA is a continuously active process that receives link-state measurements from other components in the ECM. The CA 850 determines the optimal payload-size for SDLP packets and provides this information to the SFC 948. In addition, the CA 850 determines the interval for the output of control packets by the control packet software 883.

Information for use by the CA 850 is stored in a management information base ("MIB") 852. The MIB 852 stores status and control parameters that are shared with other processes within the TECS, as discussed below. The payload from the Send Fragmentor and Concatenator ("SFC") is accepted by a Payload Handler 810. Upon receipt of the payload, the Payload Handler sends an interrupt to the Control Agent 850. The interrupt causes the Control Agent 850 to allocate memory in a Payload Frame Buffer 815. The Control Agent 850 informs the Payload Handler 810 of the location allocated in the Frame Buffer 815 and commands the Payload Handler 810 to transfer the data to the Frame Buffer 815.

When one or more payloads are present in the Payload Frame Buffer 815, the Control Agent 850 will, according to a scheduling algorithm (well-known examples include Weighted Fair Queuing, Priority, FIFO and Round Robin), command an SDLP Encoder 847 to retrieve a payload from the Frame Buffer 815, encode the payload, and send it to an output multiplexer. The Control Agent informs the Encoder 847 of the location of the payload in the Frame Buffer 815.

Skilled persons will understand that there are other architectures for implementing a protocol converter or error control module and that not all of the components of PCM 920 or ECM 940 described above are necessary to practice this invention. Additionally, a protocol converter or error control module can be implemented in software, firmware or hardware. For instance, the PCM 920 or ECM 940 may be deployed as a network interface card; a component of a network element including a switch, router, or access concentrator; a radio; modem; or transceiver; a chipset coupled to driver software; or an industry standard mezzanine circuit card.

The Encoder 847 performs forward error connection ("FEC") on the payload and adds framing and SDLP header information for output to the multiplexer. FEC is a method for encoding redundancy into data for transmission such that the detector may detect, and correct errors without the need for retransmission. Many types of FEC may be used, including more recently available Turbo Product codes, but preferably the invention uses a concatenated scheme using a Reed-Solomon FEC outer code and a convolutional FEC inner code. The invention may use other FEC techniques such as Turbo Product Codes.

Figure 12:
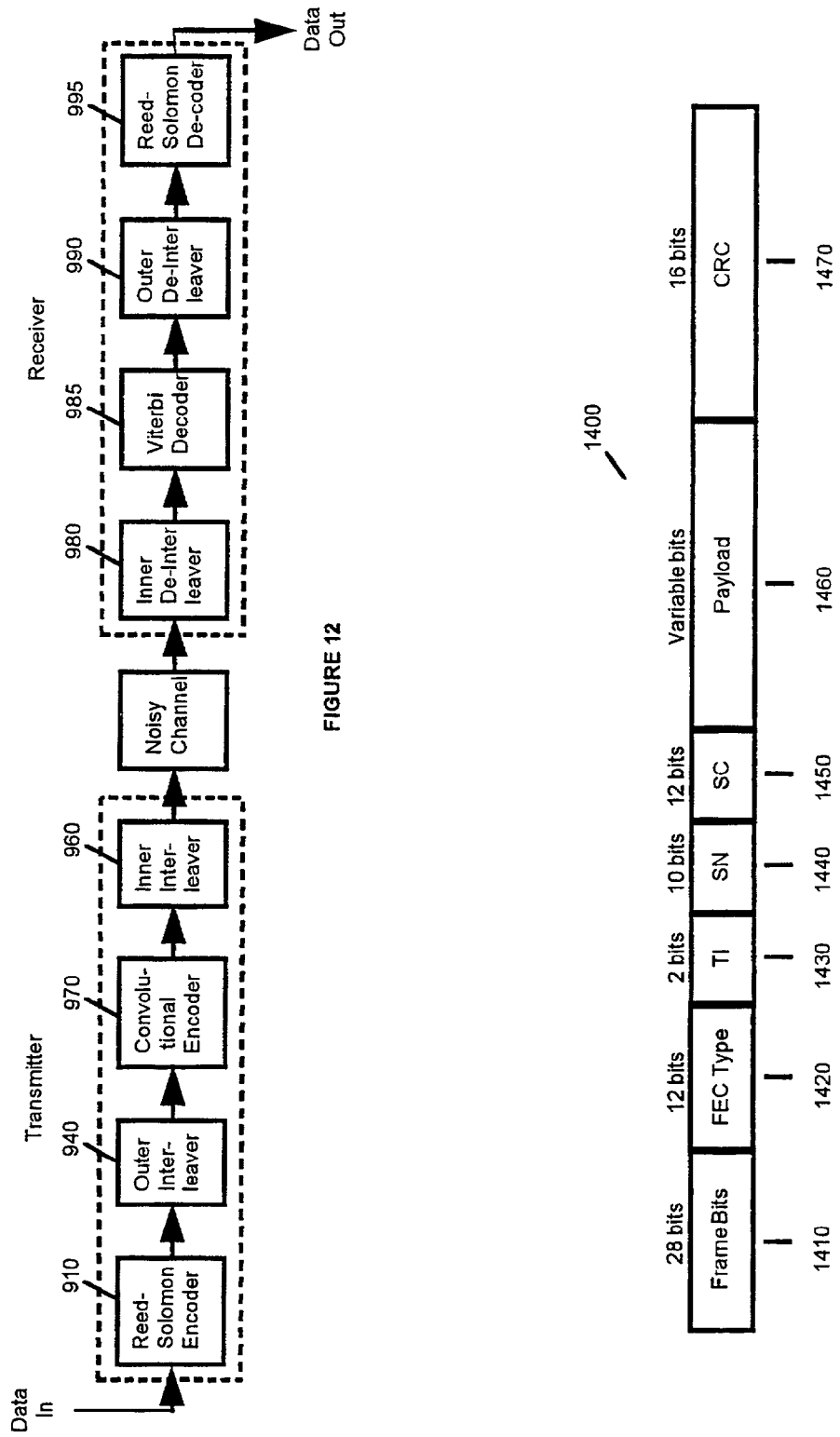
FIG. 12 illustrates the encoding and decoding of data by the protocol-independent error-control subsystem.

FIG. 12 illustrates the encoding and decoding of data by the Encoder 847 and decoder 860 of this invention. In this example, the Reed-Solomon Encoder 910 operates on bits organized into bytes. An exemplary Reed-Solomon code implementation allows block sizes between 1 and 225 bytes with the number of check symbols from 1 to 20. Using 8-bit symbols, these variations provide a range of Reed-Solomon codes from [2,1] to [245,225]. In this invention, the coding rate varies with the link quality. In addition, each traffic type may use a different Reed-Solomon code implementation.

The inner coding is Convolutional/Viterbi FEC. Convolutional coding operates on a continuous stream of bits. A typical convolutional coding code implementation has a constraint length of seven bits with coding-rates that vary between 1, ⅞, ¾, and ½, according to BER thresholds established by the operators, in a traditional system.

To vary the rate of the convolutional codes, a puncturing scheme is used. A punctured code is one where a lower rate code (i.e., ½) is converted to a higher rate code by removing bits before the data stream is transmitted and reinserting erasures into the appropriate place at the receiving end. The various code rates can be achieved by using a different level of puncturing. In this invention, each traffic type may use a different level of puncturing.

Convolutional codes perform best on randomly spaced bit errors in the data stream. Interleavers 940, 960 are placed between the Reed-Solomon coders and the Convolutional Coders. The inner interleavers randomize the data stream presented to the Viterbi decoder such that burst-errors associated with normal wireless-communications appear as randomly-spaced single-bit errors. The outer interleavers keep these burst errors from overcoming the burst-correction ability of the Reed-Solomon decoder.

Once the payload is encoded, the encoder creates an SDLP packet. FIG. 14 is a block diagram of the SDLP format. The packet 1400 includes several fields. The encoded payload is stored in the payload field 1460. Accordingly, the size of the payload field 1460 is variable. The encoder then prepends a Frame Bits field 1410 of 28 bits to indicate the beginning of the packet 1400. The FEC code is stored in the FEC type field 1420. The TI field 1430 stores a 2 bit indicator of the traffic type. For example, the field 1430 may distinguish among time-critical, quality-critical, network control/management and other control data. A sequence number is assigned to each payload and incremented (modulo the size of the sequence number range, which is 210=1024 in this example) for each payload. The sequence number is stored in the SN field 1440. This sequence number is assigned by the output ARQ module 848. A 12 bit Segment Counter field 1450 indicates the size (in bytes) of the payload data. Finally, a cyclic redundancy check 1470 is used to detect errors in transmission of the packet. These field sizes are examples. Different wireless networks and network protocols may require different values. The ARQ output module 848 also maintains an association between payloads in the frame buffer 815** and the sequence numbers and type indicators assigned to each outgoing SDLP packet.

When one or more payloads are present in the payload frame buffer, the Control Agent will, according to a scheduling algorithm, command the encoder to retrieve a payload from the buffer, apply an FEC encoding mechanism, and send it to an output multiplexer 846. The Control Agent 850 informs the encoder 847 where the payloads are located in the frame buffer 815. The Control Agent further instructs the encoder 847 to apply a specific level of FEC encoding.

The output ARQ module 848 assigns sequence numbers to outgoing packets and maintains a sliding window during transmission of packets. The module 848 also keeps an internal database of transmitted packets and updates this database based on control packets received from the data receiver 120. Non-acknowledged packets are retransmitted by the ARQ module 848. Following a sequence number request from the encoder 847, the ARQ provides the next available sequence number (modulo the size of the sequence number range).

The output multiplexer 846 accepts data from the encoder and the ARQ module 848. The multiplexer 846 prioritizes data that is sent to the first-in-first-out buffer 849. Retransmissions of data are given maximum priority while data transmissions are given minimum priority. The multiplexer may also assign relative priorities to different traffic types.

The multiplexer is activated by a false to true transition of the output FIFO 849 empty flag or the receipt of a data transfer request from the frame buffer 815. When interrupted by the FIFO 849, the multiplexer 849 checks for pending output requests and sends the data packet corresponding to the highest priority request to the FIFO 849.

Data from the FIFO is passed to an I/O interface between the ECM and the wireless transmission device, such as a Line-of-Sight radio. The interface between the ECM and the wireless transmission device is preferably a full-duplex, synchronous serial interface.

Figure 15:
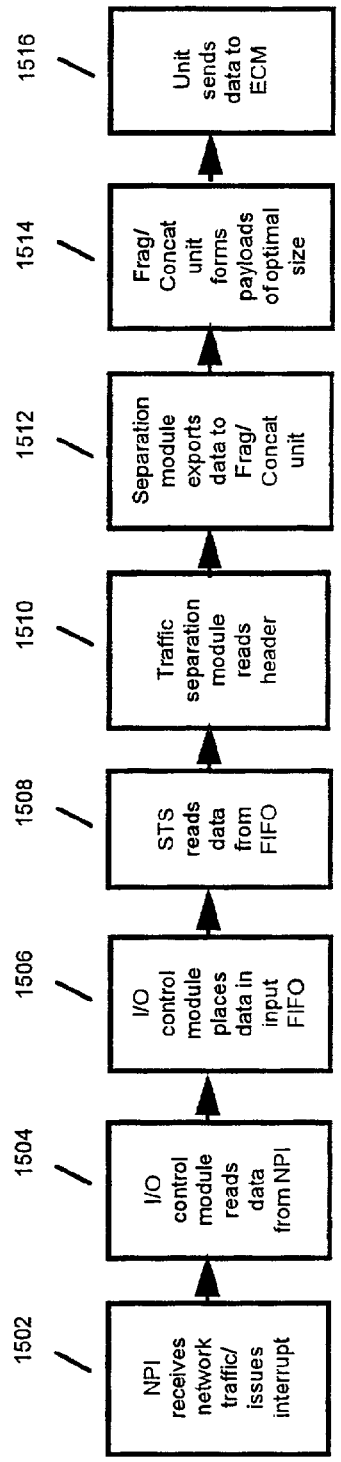
FIG. 15 is a flow chart illustrating the flow of data to be sent through the protocol converter of the TECS.

FIG. 15 is a flow chart illustrating the flow of data to be sent through the protocol converter of the TECS. In step 1502, the NPI receives traffic from the network and issues a receive interrupt. In step 1504, the I/O control module reads a data frame from the NPI. In step 1506, the I/O module places the data in the input FIFO. Upon transition of the input FIFO flag from true to false, the STS reads a data frame from the FIFO. In step 1510, the traffic separation module reads the header to determine the traffic type. In step 1512, the separation module exports the data to the Fragmentation and Concatenation unit. In step 1514, the Fragmentation and Concatenation unit fragments or concatenates the data to form payloads of the optimal size. Those payloads need not be aligned with the frame boundaries of the data frames received by the STS. In step 1516, the data is sent to the ECM.

Figure 16:
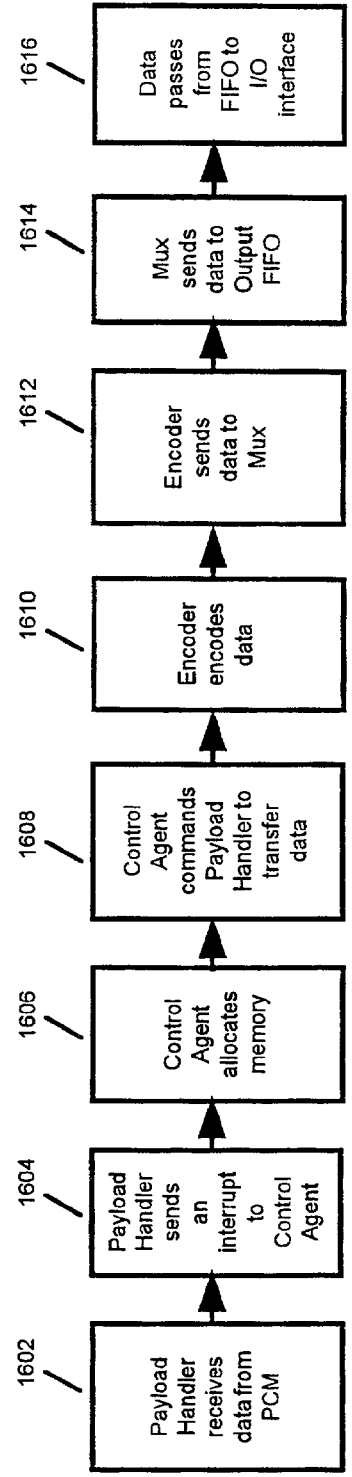
FIG. 16 is a flow chart illustrating the flow of data to be sent through the protocol-independent error-control module of the TECS.

The ECM flow is illustrated in FIG. 16. In step 1602, the payload handler receives data from the protocol converter module. In step 1604, the payload handler sends an interrupt to the control agent. In step 1608, the control agent allocates memory in the frame buffer and commands the payload handler to transfer the data. In step 1610, the encoder retrieves a payload from the buffer. The encoder, in step 1612, encodes the data and sends it to the multiplexer. In step 1614, the multiplexer sends the data packet to an output FIFO. The SDLP data from the FIFO passes to the I/O interface for output to the wireless transmission device, during step 1616.

Data Reception

Referring again to FIG. 1, data from the first 150a wireless data transceiver is transmitted to a second wireless data transceiver 150b and passed on to a TECS 824 on the receive side of the transmission. On the receive side, the TECS 824 decodes and reassembles data for use by applications 162a, 162b at the receiver endpoint 120.

Referring again to FIG. 11, data initially enters the ECM 940. Data is received at the I/O interface 853. An I/O control 851 provides timing and control for all input of SDLP-packetized serial data. The data is inserted into an input FIFO 833.

The packet decoder 860 includes 3 sub-components: (i) a framing/FEC header component 862, an FEC decoder 864, and a link quality decoder 866. The decoder 860 searches for framing information, in the input data streams, to locate the SDLP-packet boundaries. Once a packet is framed, it is decoded for error detection and correction by the FEC decoder 864. The link quality component 866 measures the current link-state by maintaining a count of the number of bit errors detected by the FEC decoder 864.

The decoder 860 is interrupt-driven and activated following a true to false transition of a status line from the input FIFO 833. Following such activation, the decoder transfers a frame from the input FIFO, decodes the data, sends link-state information to the Control Agent 850, and transfers the decoded packet to a traffic separator 887.

The traffic separator 887 examines the TI bits of the SDLP packet to determine whether the packet contains control or data information. The separator 887 then routes control information (control packets) to the control agent 850, which subsequently forwards them to the transmit ARQ module 848 for acknowledgment processing. The transmit ARQ 848 becomes active following the transfer of a control packet from the separator 887. The transmit ARQ module 848 verifies the CRC 1490 for each received control packet. If it passes that CRC check, then the transmit ARQ module 848 examines the BMAP field 1480. The transmit ARQ module 848 then removes any packets in the frame buffer 815 that are acknowledged by the control packet. If the control packet indicates the need for retransmission of a data packet, the transmit ARQ module 848 sends a retransmission request to the frame buffer 815. The transmit ARQ module assigns the same sequence to the retransmitted SDLP packet as was used by the original transmit attempt. In this embodiment, the transmit ARQ module can use the combination of the BMAP field 1480 and the m field 1455 to determine when to retransmit an SDLP packet.

Quality-critical data packets are routed to a receive ARQ subsystem 894, which verifies the CRC 1420 of that SDLP packet. If that SDLP packet passes CRC check then the subsystem 894 saves the sequence number of incoming packets in a buffer 892. This sequence number information is subsequently routed to the Transmit ARQ module 848, which generates SDLP control packets of the form shown in FIG. 5. The quality-critical data packets are then passed to a packet disassembly system 899. The receive ARQ subsystem 894 ensures that packets are not transmitted out of sequence.

Time-critical packets are routed to a receive non-ARQ subsystem 896, and subsequently to a packet disassembly system 899. The receive non-ARQ subsystem also verifies the CRC 1420 of the SDLP packet. Time-critical packets that fail the CRC check may be either discarded or replaced with an appropriate "filler packet" that compensates for the loss of that time-critical packet. The "filler packet" may help maintain timing relationships between adjacent time-critical SDLP packets or provide error-masking based on the contents of the last time-critical SDLP packet.

The packet disassembly subsystem 899 unpacks the SDLP data packets to reconstruct network packets.

The Receive Defragmentation and Deconcatenation unit (the "RFC") 949 (FIG. 10) accepts SDLP payloads from the packet disassembly unit 899 of the ECM. The RFC then examines the header and fragmentation header information in the payload data to reconstruct the network packets. The payload is then deposited into a FIFO 955. Following a transmit interrupt from the FIFO, the I/O control checks the empty flag of the FIFO 955. If the flag is false, the I/O control module transfers a data frame from the FIFO 955 to the NPI 942. Data from the NPI is transmitted back to the network via a network device, such as a NIC card.

Figure 17:
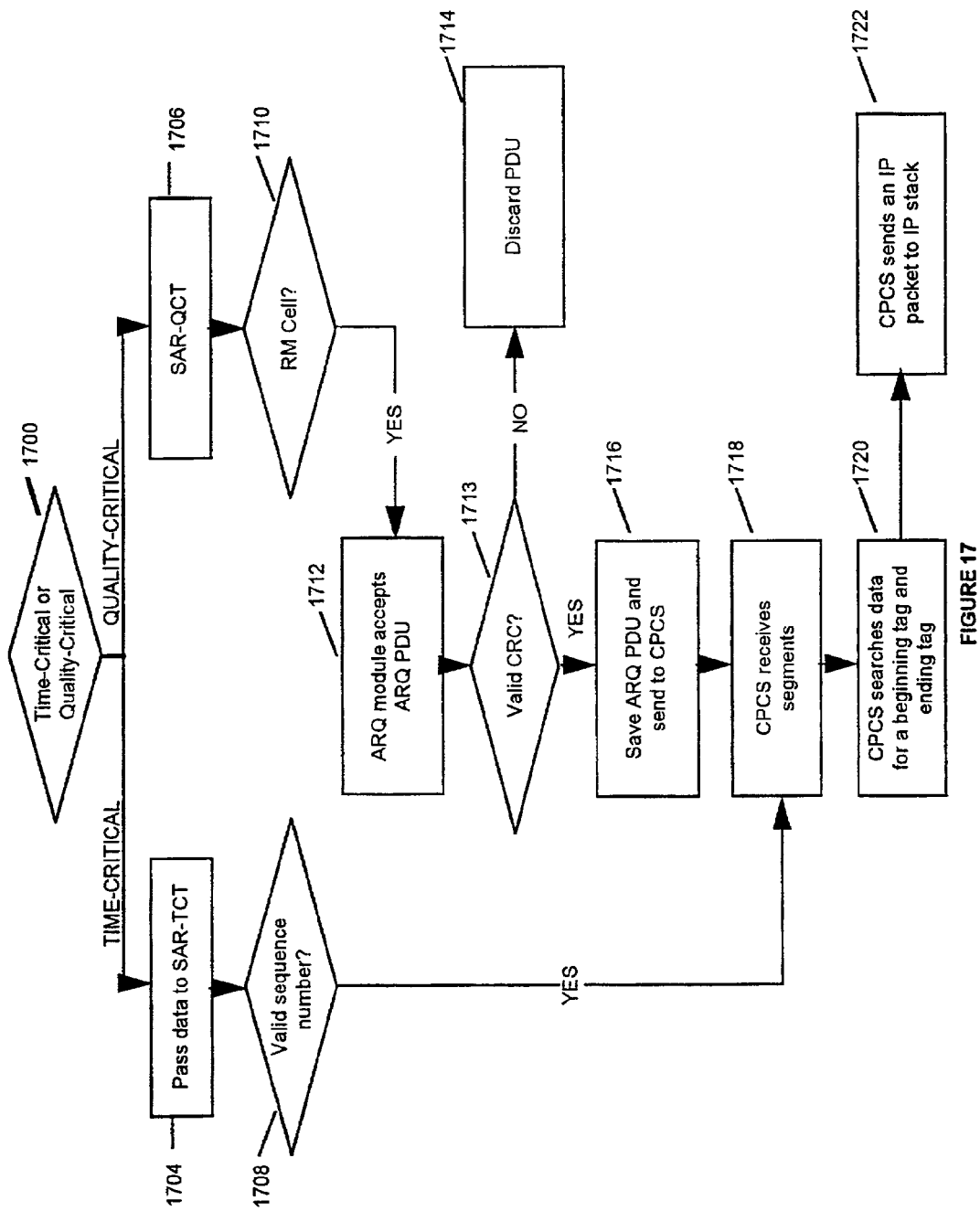
FIG. 17 is a flow chart of the processing of the AAL and the application for receipt of an ATM cell payload and reconstruction of data.

If the network device is an ATM NIC then FIG. 17 is a flow chart of the subsequent processing by the AAL and the application for receipt of an ATM cell payload and reconstruction of data. In step 1706, the received ATM cell is passed to the SAR QCT module if it is quality-critical traffic or to the SAR TCT module in step 1704 if it is time-critical traffic.

The SAR TCT verifies the sequence number of the received SAR TCT PDU in step 1708. If the sequence number is valid, the cells are concatenated with previously-received cells. If one of those cells is the last received cell, then the concatenated payload is passed to the CPCS module.

In the SAR QCT, the ATM cell is examined in step 1710 to determine whether it is an RM cell or not. RM cells are passed to the ARQ module in step 1712. Other cells are concatenated with previously-received cells in step 1706. If the cell is the last received cell within an ARQ-PDU, the ARQ PDU is passed to the ARQ module.

In step 1712, the ARQ module accepts the ARQ PDU. The ARQ verifies the cyclic redundancy check of the PDU in step 1712. If the CRC is valid, the ARQ PDU is saved as a function of its sequence number and transmitted to the CPCS in order of receipt. Otherwise, the PDU is discarded in step 1714. For RM cells, the ARQ module extracts the control message. The CRC is extracted and verified. If the CRC is valid, all sequence numbers preceding the MSN are marked as acknowledged and removed. Retransmissions may occur based on the information in the control message.

At the CPCS sublayer, in step 1718, received segments are appended to previously received segments. Next in step 1720, the CPCS searches the concatenated data for a beginning tag. Once located, the length is extracted. The next byte is then searched for an ending tag. Once the ending tag is found, the payload, an IP packet, is sent to the IP stack. Data from the IP stack may then be read by the data receiver.

Having thus described a preferred embodiment of an error control system, it should be apparent to those skilled in the art that certain advantages have been achieved. It should also be appreciated that various modifications, adaptations, and alternative embodiments thereof may be made within the scope and spirit of the present invention. The invention is further defined by the following claims:

What is claimed is:

1. A method for dynamically optimizing error control within a network using an asynchronous transfer mode protocol, the method comprising:
    determining whether a selected data transmission includes time critical or quality critical data;
    parsing at least a portion of the quality critical data into automatic retransmit request packet data units ("ARQ-PDUs");
    modifying a payload length of the ARQ-PDUs based on quality of a data link assigned to carry the selected data transmission in order to improve throughput efficiency; and
    retransmitting, upon satisfaction of a preselected criteria, the quality critical data in order to ensure that said data reaches its destination.

2. The method of claim 1 further comprising the step of measuring the quality of the data link assigned to carry the selected data transmission.

3. The method of claim 2 in which the quality measuring is performed by analyzing either (1) information received from a destination receiver within the ATM network or (2) statistics indicating the error rate of transmitted ARQ-PDUs.

4. The method of claim 2 in which the payload length ("L") is calculated as follows: $L=48*i-4$, wherein i is the sum of the header and trailer for the selected ARQ-PDUs to be transmitted.

5. The method of claim 2 further comprising the step of updating a generation rate of control packets based on the modified payload length.

6. The method of claim 2 further comprising the step of transmitting periodic control messages that describe the success or failure of a particular quality critical data transmission.

7. The method of claim 1 further comprising the step of applying to time critical data a forward error correction encoding scheme that varies according to the quality of the data link.

8. The method of claim 2 further comprising the step of determining the quality of service requirements associated with the selected data transmission.

9. The method of claim 8 further comprising the step of determining the number of attempts to retransmit a particular quality critical data transmission based upon the determined quality of service requirement associated with the selected data transmission.

10. A system deployed in a network having a data sender, a data receiver, and a wireless transmission device, the system comprising:
    a first asynchronous transfer mode adaptation layer that delivers quality critical data from the data sender to a network device;
    a second asynchronous transfer mode adaptation layer that delivers time-critical data from the data sender to a network device; and
    an error control module that modifies the payload length of the data, that encodes the data by applying a forward error correction (FEC) encoding scheme to the data, wherein the modification of the payload length and the encoding of the data are adaptive and based on quality of service requirements of the data, so that data associated with a first quality of service requirement is encoded using a first FEC encoding scheme and has a first payload length and data associated with a second quality of service requirement is encoded using a second FEC encoding scheme and has a second payload length, and that outputs the data to the wireless transmission device.

11. The system according to claim 10 further comprising a protocol converter module that separates network data traffic by data type.

12. The system according to claim 11 in which the data type is the quality of service level for the data.

13. The system according to claim 10 in which the error control module is adapted to determine whether selected criteria are satisfied and thereafter retransmit quality critical data in order to ensure delivery.

14. The system according to claim 13 wherein the first asynchronous transfer mode adaptation layer is coupled to an IP stack providing the time-critical or quality-critical data in the form of an IP packet and further comprises a first sublayer that creates a data unit containing the IP packet.

15. The method or system of claim 7 in which the forward error correction encoding scheme is selected from the group consisting of (a) a Reed-Solomon forward error correction scheme; (b) a convolutional forward error correction scheme; (c) a Turbo Product Code error correction scheme; and (d) any combination of the foregoing.

* * * * *